(12) United States Patent
Zalevsky

(10) Patent No.: US 12,519,918 B2
(45) Date of Patent: Jan. 6, 2026

(54) HIGH RESOLUTION IMAGING BEHIND SCATTERING MEDIUM

(71) Applicant: Bar Ilan University, Ramat Gan (IL)

(72) Inventor: Zeev Zalevsky, Rosh HaAyin (IL)

(73) Assignee: BAR ILAN UNIVERSITY, Ramat Gan (IL)

( * ) Notice: Subject to any disclaimer, the term of this patent is extended or adjusted under 35 U.S.C. 154(b) by 377 days.

(21) Appl. No.: 18/298,736

(22) Filed: Apr. 11, 2023

(65) Prior Publication Data
US 2023/0328219 A1  Oct. 12, 2023

Related U.S. Application Data

(60) Provisional application No. 63/329,492, filed on Apr. 11, 2022.

(51) Int. Cl.
*H04N 13/254* (2018.01)
*H04N 13/296* (2018.01)

(52) U.S. Cl.
CPC ......... *H04N 13/254* (2018.05); *H04N 13/296* (2018.05)

(58) Field of Classification Search
CPC .................................................. H04N 13/254
See application file for complete search history.

(56) References Cited

U.S. PATENT DOCUMENTS

| | | | |
|---|---|---|---|
| 2017/0254932 A1* | 9/2017 | Huang | G02F 1/21 |
| 2018/0177401 A1* | 6/2018 | Yang | G01N 21/6458 |
| 2018/0293739 A1* | 10/2018 | Gupta | G06V 10/62 |

(Continued)

FOREIGN PATENT DOCUMENTS

WO  2020/157759 A1  8/2020

OTHER PUBLICATIONS

Badon, A. et al. Smart optical coherence tomography for ultra-deep imaging through highly scattering media. Imag. Appl. Opt. (2017).

(Continued)

*Primary Examiner* — Benjamin O Dulaney
(74) *Attorney, Agent, or Firm* — FisherBroyles, LLP; Roger L. Browdy

(57) ABSTRACT

A system is presented for imaging objects through scattering medium. The system includes an imaging system including: light source generating input light forming coherent illumination of selected wavelength range(s); beam shaping unit generating selectively varying wavefront patterns of the input light forming wavefront shaped coherent illumination propagating through the scattering medium to an object region; interferometric unit; and detection unit comprising pixelated detector(s) detecting output light originated at said object being illuminated and passed through said scattering medium, and generating measured data comprising amplitude and phase of the output light and image data about the object. Beam shaping controller analyzes the measured data and generates operational data to the beam shaping unit to produce optimized wavefront shaped coherent illumination comprising multiple illumination spots focused on different focal planes at the object region and different lateral locations in each focal plane, to extract 3D structure of the object from image data.

20 Claims, 13 Drawing Sheets
(12 of 13 Drawing Sheet(s) Filed in Color)

(56) References Cited

U.S. PATENT DOCUMENTS

| | | | |
|---|---|---|---|
| 2019/0277748 A1* | 9/2019 | Choi | A61B 5/0059 |
| 2021/0041219 A1* | 2/2021 | Müller | G01B 9/02057 |
| 2021/0310787 A1* | 10/2021 | Aubry | G01B 9/02091 |
| 2021/0310788 A1* | 10/2021 | Zawadzki | G01B 9/0201 |
| 2022/0163444 A1* | 5/2022 | Zalevsky | G01N 21/47 |
| 2024/0239039 A1* | 7/2024 | Moser | B33Y 30/00 |

OTHER PUBLICATIONS

Lee, S.-Y., Parot, V. J., Bouma, B. E. & Villiger, M. Reciprocity-induced symmetry in the round-trip transmission through Complex Systems. APL Photon. 5, 106104(2020).

Satat, G., Heshmat, B., Raviv, D. & Raskar, R. All photons imaging through volumetric scattering. Sci. Rep. 6, 1 (2016).

Radford, J., Lyons, A., Tonolini, F. & Faccio, D. The role of late photons in time-of-flight diffuse optical tomography. Imag. Appl. Opt. Cong. https://doi.org/10.1364/isa.2020.if2e.5 (2020).

Singh, A. K., Pedrini, G., Takeda, M. & Osten, W. Scatter-plate microscope for lensless microscopy with diffraction-limited resolution. Sci. Rep. 7, 10687 (2017).

Jang, M. et al. Wavefront shaping with disorder-engineered metasurfaces. Nat. Photon. 12, 84-90 (2018).

Katz, O., Ramaz, F., Gigan, S. & Fink, M. Controlling light in complex media beyond the acoustic diffraction-limit using the acousto-optic transmission matrix. Nat. Commun. 10, 1 (2019).

Razansky, D. et al. Multispectral opto-acoustic tomography of deep-seated fluorescent proteins in vivo. Nat. Photon. 3, 412-417 (2009).

Vellekoop, I. M. & Mosk, A. P. Focusing coherent light through opaque strongly scattering media. Opt. Lett. 32, 2309 (2007).

Popoff, S. M. et al. Measuring the transmission matrix in optics: an approach to the study and control of light propagation in disordered media. Phys. Rev. Lett. 104, 100601 (2010).

Vellekoop, I. M., Cui, M. & Yang, C. Digital optical phase conjugation of fluorescence in turbid tissue. Appl. Phys. Lett. 101, 081108 (2012).

Sanjeev, A. et al. Non-invasive imaging through scattering medium by using a reverse response wavefront shaping technique. Sci. Rep. 9(1), 1-11 (2019).

Silveirinha, M. G. Hidden time-reversal symmetry in dissipative reciprocal systems. Opt. Express 27, 14328 (2019).

Zhu, L. et al. Chromato-axial memory effect through a forward-scattering slab. Optica 7, 338 (2020).

M. Aviv, E. Gur and Z. Zalevsky, "Experimental results of revised Misell algorithm for imaging through weakly scattering biological tissue," Appl. Opt. 52, 2300-2305 (2013)—Abstract only.

M. Aviv Shalev, Y. Rivenson, A. Meiri and Z. Zalevsky, "Phase retrieval deburring for imaging of an high scattering object within a low scattering biological tissue," Journal of Biomed. Opt. 21 (9), 096008 (Sep. 16, 2016).

* cited by examiner

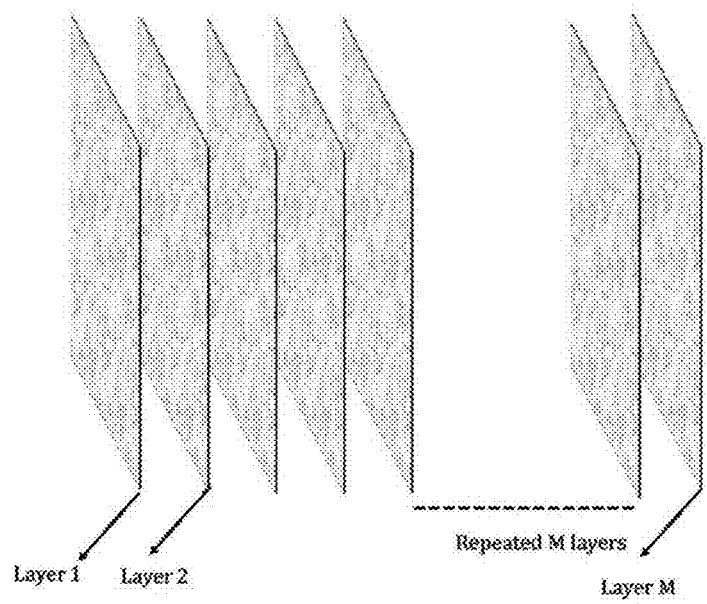
FIG. 4
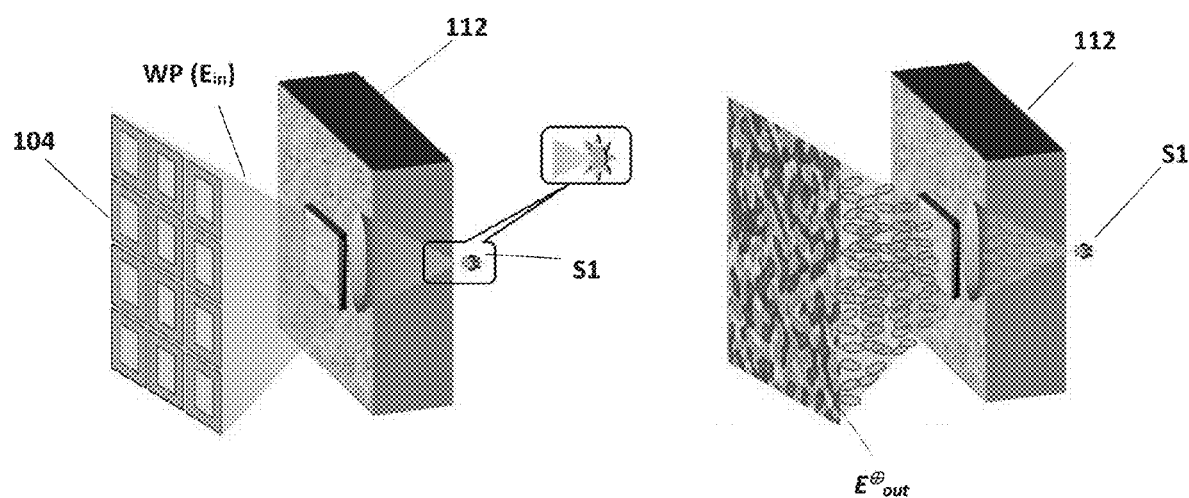
FIG. 5A  FIG. 5B

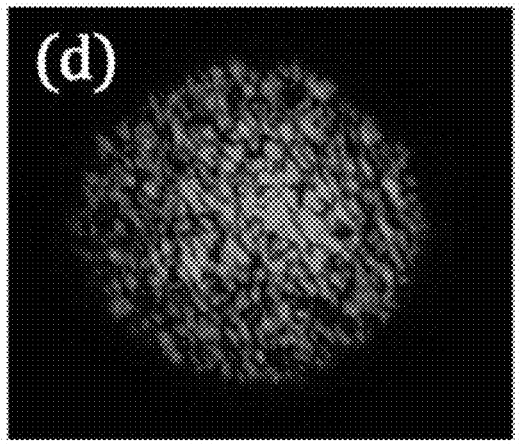
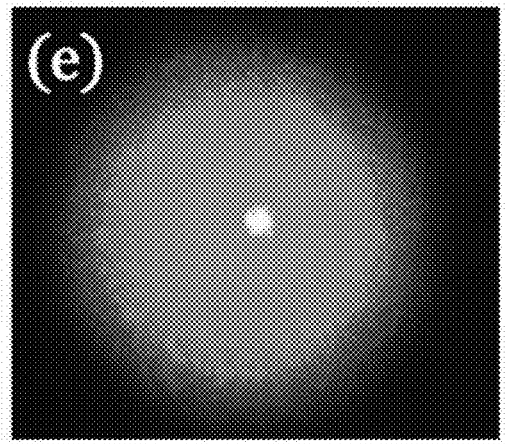
FIG. 11D                    FIG. 11E
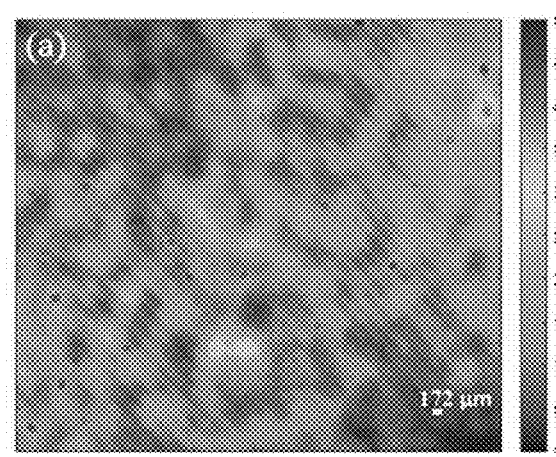
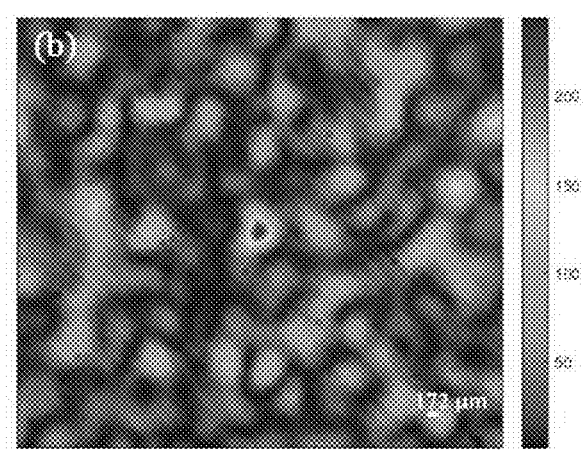
FIG. 12A                    FIG. 12B

HIGH RESOLUTION IMAGING BEHIND SCATTERING MEDIUM

TECHNOLOGICAL FIELD

The present invention is in the field of imaging techniques and relates to imaging system and method for imaging objects behind a scattering medium. The invention is particularly useful for imaging a region of interest inside a subject's body via a scattering medium of a skin.

BACKGROUND ART

References considered to be relevant as background to the presently disclosed subject matter are listed below:
1. Badon, A. et al. Smart optical coherence tomography for ultra-deep imaging through highly scattering media. Imag. Appl. Opt. (2017)
2. Lee, S.-Y., Parot, V. J., Bouma, B. E. & Villiger, M. Reciprocity-induced symmetry in the round-trip transmission through Complex Systems. APL Photon. 5, 106104 (2020).
3. Satat, G., Heshmat, B., Raviv, D. & Raskar, R. All photons imaging through volumetric scattering. Sci. Rep. 6, 1 (2016).
4. Radford, J., Lyons, A., Tonolini, F. & Faccio, D. The role of late photons in time-of-flight diffuse optical tomography. Imag. Appl. Opt. Cong. https://doi.org/10.1364/isa.2020.if2e.5 (2020).
5. Singh, A. K., Pedrini, G., Takeda, M. & Osten, W. Scatter-plate microscope for lensless microscopy with diffraction-limited resolution. Sci. Rep. 7, 10687 (2017).
6. Jang, M. et al. Wavefront shaping with disorder-engineered metasurfaces. Nat. Photon. 12, 84-90 (2018).
7. Katz, O., Ramaz, F., Gigan, S. & Fink, M. Controlling light in complex media beyond the acoustic diffraction-limit using the acousto-optic transmission matrix. Nat. Commun. 10, 1 (2019).
8. Razansky, D. et al. Multispectral opto-acoustic tomography of deep-seated fluorescent proteins in vivo. Nat. Photon. 3, 412-417 (2009)
9. Vellekoop, I. M. & Mosk, A. P. Focusing coherent light through opaque strongly scattering media. Opt. Lett. 32, 2309 (2007).
10. Popoff, S. M. et al. Measuring the transmission matrix in optics: an approach to the study and control of light propagation in disordered media. Phys. Rev. Lett. 104, 100601 (2010).
11. Vellekoop, I. M., Cui, M. & Yang, C. Digital optical phase conjugation of fluorescence in turbid tissue. Appl. Phys. Lett. 101, 081108 (2012)
12. Sanjeev, A. et al. Non-invasive imaging through scattering medium by using a reverse response wavefront shaping technique. Sci. Rep. 9(1), 1-11 (2019).
13. Silveirinha, M. G. Hidden time-reversal symmetry in dissipative reciprocal systems. Opt. Express 27, 14328 (2019).
14. Zhu, L. et al. Chromato-axial memory effect through a forward-scattering slab. Optica 7, 338 (2020).
15. M. Aviv, E. Gur and Z. Zalevsky, "Experimental results of revised Misell algorithm for imaging through weakly scattering biological tissue," Appl. Opt. 52, 2300-2305 (2013).
16. M. Aviv Shalev, Y. Rivenson, A. Meiri and Z. Zalevsky, "Phase retrieval deburring for imaging of an high scattering object within a low scattering biological tissue," Journal of Biomed. Opt. 21 (9), 096008 (Sep. 16, 2016).

Acknowledgement of the above references herein is not to be inferred as meaning that these are in any way relevant to the patentability of the presently disclosed subject matter.

BACKGROUND

Light passing through a scattering media, such as biological tissues, undergoes scattering which creates difficulties for an imaging system to produce quality images. Especially while using a monochromatic laser source, random interference produces speckles. Hence, it is difficult to achieve optical focusing and imaging for its internal targets, which restricts in-depth imaging for medical diagnosis and treatment. The information gets distorted within the speckle. However, the information is not lost, it just needs to be retrieved from the scattered speckle pattern. Starting from the late 1960s, many researchers have paved the way for this desirous goal of imaging through a scattering media.

The Optical Coherence Tomography technique utilizes the ballistic photons (photons that are not scattered) for imaging making it an important tool in many diagnostic measurements [1]. However, this technique suffers from the fact that it requires a lot of image processing tools, and post processing. Also, it is not very effective for thick scattering medium, especially when the thickness is larger than the mean free path as the number of ballistic photons will be very few and the signal will be corrupted by non-ballistic photons as well [3,4].

Acoustic waves can also be used in conjunction with the optical wave for deep tissue imaging because of the deeper penetration of acoustic waves. To this end, there exist techniques like photoacoustic tomography [7] acoustic-Opto tomography and ultrasound-guided optical imaging The afore mentioned techniques are non-invasive with the capability to shift the achieved focus. However, the main disadvantage lies in the fact that the resolution of the focal spot depends on the ultrasonic wavelength which is orders of magnitude inferior to the optical diffraction limit.

Optical Wavefront Shaping Technique is potentially a strong candidate for focusing light through a scattering media by shaping the incident wavefront employing some feedback from the behind of the scattering media. Vellekoop et al [9] utilized a Spatial Light Modulator (SLM) to modulate the incoming phase of the beam. A camera was placed behind the scattering medium, and this acted as feedback to guide the wavefront pattern on the SLM.

Later Popoff et al [10] came up with the idea of measuring the transmission matrix of a scattering media and used it to introduce the inverse phase on the SLM to get a focused spot behind the scattering media. This method requires an initial calibration to find the complete transmission matrix. There were several works done by using SLM as a phase compensator to image through a scattering medium [6]. Among them, optical phase conjugation is a well-known technique wherein the light distribution is replicated by reversing the propagation direction of the detected field while conjugating its wavefront. Digital optical phase conjugation (DOPC) has been well established for focusing and imaging through complex or disordered media [11].

Imaging techniques suitable for imaging objects through diffusive media have been developed by the inventor of the present application and are described for example in WO2020/157759. According to this technique, an imaging unit is used comprising: at least one light source providing coherent illumination with selected wavelength range; and a spatial light modulator for selectively varying spatial pattern of wavefront of light generated by the at least one light source; at least one detector array located next to the at least one light source unit for collecting light reflected from a sample being illuminated. A control system is used which is configured for selectively varying spatial pattern of wavefront of light generated by the at least one light source in accordance with spatial pattern of light collected by the at least one detector array to satisfy a reflectance condition indicative of relation between spatial pattern of the wavefront and spatial pattern of the collected light.

GENERAL DESCRIPTION

There is a need in the art for a novel imaging technique which is capable of high-resolution imaging of an object through a scattering medium and also enabling reconstruction of a 3D structure of the object.

Indeed, most of the above-mentioned known techniques require either some sort of feedback from behind the scattering media or need to know the scattering properties beforehand or need to perform some sort of post-processing algorithms Most of these techniques operate in a so-called "transmission mode" where a camera is located behind an object being imaged through a scattering medium located between a light source and the object.

The present invention takes advantage of the earlier imaging technique developed by the inventor of the present application and described in the above-mentioned patent publication WO2020/157759, namely the system configuration of a so-called "reflection mode" where the light source and detector are located at the same side of the scattering medium (and of the object being imaged). Also, according to that earlier technique, the object is illuminated by varying spatial patterns of wavefront of incident light, where these varying spatial patterns of wavefront are selected to satisfy a reflectance condition of a relation between the selected spatial pattern of the wavefront of incident light and a spatial pattern of light reflected from the object.

In the present disclosure, a novel imaging technique is presented which utilizes a reflection mode system architecture and provides for imaging an object, through an unknown scattering medium, along each of the multiple different focal planes through the object, and by this reconstruct a 3D structure of the object. To this end, the technique of the present disclosure utilizes detection of measured data comprising amplitude and phase of output light returned from an illumination spot on the object in response to input light (coherent illumination) having certain wavefront pattern of the light field, and utilizing these measured data to optimize the wavefront shaped coherent illumination to project it (simultaneously or sequentially) onto multiple different focal planes (z-direction through the object) and (simultaneously or sequentially) onto multiple locations along each focal plane (x-y plane across the object) and properly interpret image data being detected.

It should be noted, and will be described in detail below, that the technique of the present disclosure provides for simultaneous imaging of multiple locations of the object at different focal planes (depth resolved imaging), as well as provides for simultaneous illumination of multiple spots along the same focal plane, thus eliminating or at least significantly reducing scanning requirements. According to the technique of the present disclosure, the object located behind scattering medium is illuminated by selectively varying wavefront patterns (i.e. in accordance with selected planes/locations) of input light implementing axial and lateral shifts of illumination spots through and along/across the object region.

Thus, according to one broad aspect of the present disclosure, it provides a system for use in imaging an object through a scattering medium, the system comprising:

an imaging system comprising: a light source unit generating input light forming coherent illumination of at least one selected wavelength range; a beam shaping unit controllably operable to generate selectively varying wavefront patterns of said input light to thereby form wavefront shaped coherent illumination propagating through the scattering medium towards an object region; and a detection unit comprising at least one pixelated detector configured and operable to detect light including output light originated at said object in response to said wavefront shaped coherent illumination and passed through said scattering medium, and generate image data about the object; and a control system in data communication with the beam shaping unit and with said detection unit and comprising an image processor configured and operable to process the image data and generate structured data indicative of a structure of the object;

wherein said imaging system comprises an interferometric unit, said detection unit further generating measured data comprising amplitude and phase of the output light; and wherein the control system further comprises a beam shaping controller configured and operable to analyze the measured data and produce operational data to said beam shaping unit indicative of optimized selectively varying wavefront patterns to produce optimized wavefront shaped coherent illumination comprising multiple illumination spots focused on a first array of focal planes at the object region and a second array of lateral locations in each focal plane, said image processor utilizing the image data and data indicative of said operational data to interpret the image data and extract therefrom the structured data indicative of a 3D structure of the object.

It should be understood, and will be described further below, that the technique of the present disclosure provides for controlling focal position of each individual point (illumination spot) in three dimensions, as well as controlling such positions for an array of the points, where the position of each point is individually/separately controlled.

The selectively varying wavefront patterns of the input light are optimized based on the analysis of the measured data (amplitude and phase of the output light returned from the object) to satisfy a predetermined condition of a relation between the input and output light fields, while this condition is optimized (based on the measured data) for each focal plane and each location/point (illumination spot) in the focal plane.

In some embodiments, the interferometric unit is configured and operable to split coherent light emitted by the light source into an off-axis reference beam propagating towards the detection unit and an on-axis object beam forming the input light propagating towards the beam shaping unit. The output light and the reference beam are combined into the light being detected and being indicative of an interference pattern between the reference beam and the output light that passed twice through the scattering medium.

In some embodiments, the beam shaping unit comprises a spatial light modulator (SLM). The SLM may be configured to define a matrix of phase affecting elements. For example, the matrix of the phase affecting elements comprise an array of separately operable sub-arrays of said phase affecting elements.

Alternatively or additionally, the beam shaping unit comprising the SLM is configured and operable to generate the selectively varying wavefront patterns comprising consecutively generated varying wavefront patterns. The imaging system thus performs time scanning of the object region with the multiple illumination spots, such that the illumination spots of the first array (arranged along the z-axis) are consecutively projected on a corresponding array of the focal planes at the object region. For example, the consecutively generated varying wavefront patterns are such that the illumination spots of the second array of the lateral locations are consecutively projected on a corresponding array of the lateral locations in the corresponding array of the focal planes, respectively.

In some embodiments, the beam shaping unit comprising the SLM operates such that the selectively varying wavefront patterns correspond to simultaneous generation of the multiple illumination spots including a plurality of the illumination spots on the first array of different focal planes. For example, the selectively varying wavefront patterns correspond to simultaneous generation of the multiple illumination spots including a plurality of the illumination spots on the second array of the lateral locations in at least one focal plane or in the different focal planes.

In some embodiments, the imaging system is configured and operable to generate the illumination spots of different wavelength ranges.

In some embodiments, the operational data is indicative of axial shifts of focus of the imaging system thereby forming the first array of the focal planes downstream of the scattering medium with respective to a general propagation direction of the coherent illumination.

For example, the beam shaping controller is configured and operable to analyze the measured data and determine an optimized wavefront shaping function to be applied to the input light to satisfy a predetermined condition of a relation between optical fields of the input light and the output light, $E_{in}$ and $E_{out}$, with respect to each desired focal plane downstream of the scattering medium. This may be implemented by providing in the beam shaping controller an axial-shift optimizer utility which is configured and operable to utilize representation of the output light field $E_{out}$ originated at the desired focal plane at a z-distance from a plane of the scattering medium as $g(z) \cdot E^{\oplus}_{out}$, wherein $E^{\oplus}_{out}$ is a conjugate of $E_{out}$, and $g(z)$ is a predetermined function describing light propagation through a given space, and determine an optimization function to be applied to the input light to satisfy the predetermined condition of the relation between an optimized input light field, $(E_{in})_{opt}$, and said representation of the output light field $g(z) \cdot E^{\oplus}_{out}$. Preferably, the beam shaping controller also includes an axial-shift optimizer utility which is configured and operable to utilize representation of the output light field $E_{out}$ originated at the desired focal plane at a z-distance from a plane of the scattering medium as $g(z) \cdot E^{\oplus}_{out}$, wherein $E^{\oplus}_{out}$ is a conjugate of $E_{out}$, and $g(z)$ is a predetermined function describing light propagation through a given space, and determine an optimization function to be applied to the input light to satisfy said predetermined condition of the relation between an optimized input light field, $(E_{in})_{opt}$, and said representation of the output light field $g(z) \cdot E^{\oplus}_{out}$. The predetermined condition of the relation between the optimized input light field, $(E_{in})_{opt}$, and the representation of the output light field $g(z) \cdot E^{\oplus}_{out}$ for the desired focal plane is: $(E_{in})_{opt} = g(z) \cdot E^{\oplus}_{out}$.

In some embodiments, the operational data is indicative of lateral shifts of focus of the imaging system, thereby forming the second array of the lateral locations of the illumination spot in the focal plane. For example, the beam shaping controller comprises a lateral-shift optimizer utility which is configured and operable to analyze the measured data and determine an optimization factor to be applied to the input light $E_{in}$ to project the illumination spot on a laterally shifted location, said optimization factor being a linear phase gradient.

In some embodiments, the operational data, in addition to axial shifts, is also indicative of lateral shifts of focus of the imaging system, thereby forming said second array of the lateral locations of the illumination spot in the focal plane, in which case the beam shaping controller comprises a lateral-shift optimizer utility configured and operable to analyze the measured data and determine an optimization factor to be applied to the input light $E_{in}$ to project the illumination spot on a laterally shifted location, said optimization factor being a linear phase gradient.

The present disclosure, in its further broad aspect, provides a control system for use in imaging of an object through a scattering medium. The control system is configured as a computer system comprising data input and output utilities, a memory utility and a data processor. The data processor comprises:

a beam shaping controller configured and operable to operate a beam shaping unit affecting a wavefront pattern of coherent illumination of input light, said beam shaping controller being configured and operable to process measured data generated by a pixelated detector and being indicative of at least a phase of output light which is originated at the object in response to said wavefront pattern of the input light incident on the object via the scattering medium and which passed through said scattering medium to the pixelated detector, processing of the measured data comprising generation of operational data to the beam shaping unit comprising data indicative of selectively varying optimized wavefront patterns of the input light to be used in imaging sessions, said optimized wavefront patterns of the input light convergence conditions with respect to the output light for multiple illumination spots to be focused on a first array of focal planes at the object and a second array of lateral locations in each focal plane, an image processor configured and operable to receive image data generated by the pixelated detector and data indicative of said operational data to interpret the image data and extract therefrom structured data indicative of a 3D structure of the object.

As indicated above and will be described further below, the control system provides for controlling focal position of each individual point (illumination spot) in three dimensions, as well as controlling such positions for an array of the points, where the position of each point is individually/separately controlled.

BRIEF DESCRIPTION OF THE DRAWINGS

The patent or application file contains at least one drawing executed in color. Copies of this patent or patent application publication with color drawings will be provided by the Office upon request and payment of the necessary fee.

In order to better understand the subject matter that is disclosed herein and to exemplify how it may be carried out in practice, embodiments will now be described, by way of non-limiting example only, with reference to the accompanying drawings, in which:

FIG. 4 shows schematically the principle of modelling a thick scattering medium as a stack of M phase plates followed by a small free-pace propagation;

FIG. 5A demonstrates an ideal-shaped wavefront that produces a focused spot behind the thick scattering media; and FIG. 5B shows focused light propagation through the same scattering medium in a backward scattering direction; showing that output wavefront being measured is conjugate of the ideal shaped wavefront, which is the condition to obtain focus after the first pass through the media;

FIG. 6A is an illustration of the axial tuning of focus on two different planes using a corresponding optimized phase map; and FIG. 6B is an illustration of lateral shifting of focus by applying a linear phase gradient to the optimized phase map;

FIGS. 7A to 7C show simulation results, wherein FIG. 7A shows the focus obtained after optimization when the scattering medium is illuminated with the correct phase mask that cancels the effect of scattering medium to obtain a strong focus non-invasively, FIG. 7B shows scattered speckle pattern on the last plane of the scattering medium when it is illuminated with a plane wave, and FIG. 7C shows an intensity profile along an axis for both FIG. 7A and FIG. 7B (marked in blue and red respectively);

FIGS. 8A to 8D show simulation results, wherein FIG. 8A shows focus obtained at the last diffuser plane, FIG. 8B shows shift in focus when the optimized phase mask is multiplied by a linear phase shift in positive x-direction, FIG. 8C shows shift in focus when the optimized phase mask is multiplied by a linear phase shift in negative x-direction, FIG. 8D shows shift in focus when the optimized phase mask is multiplied by a linear phase shift both in x and y directions;

FIGS. 9A to 9C show simulation results, wherein FIG. 9A shows focus obtained on a different z plane, when the scattering medium is illuminated with the the wavefront of the optimized phase mask, FIG. 9B shows speckle pattern on the current z plane before optimization, and FIG. 9C shows the profile view of the intensity pattern obtained in FIG. 9A and FIG. 9B;

FIGS. 11A to 11E show experimental results, wherein FIG. 11A shows scattered speckle pattern on CAM2 when the scattering medium is illuminated with a plane wave at a distance of (z=100 mm) from the diffuser, FIG. 11B shows the optimized focus after optimization, FIG. 11C shows intensity profile along an axis for both FIG. 11A and FIG. 11B (marked in red and blue, respectively), FIG. 11D is a photo taken on a smartphone of the case of FIG. 11A on a screen, and FIG. 11E is a photo taken on a smartphone of the case of FIG. 11B on a screen;

FIGS. 12A to 12D show experimental results, wherein FIG. 12A shows scattered speckle pattern on CAM2 when the scattering medium is illuminated with a plane wave at (z=150 mm) from the diffuser, FIG. 12B shows the optimized focus after optimization, FIG. 12C shows intensity profile along an axis for both FIG. 12A and FIG. 12B (marked in red and blue respectively), and FIG. 12D shows schematically the axial focal spot scanning along the z axis at z=100 mm and z=150 mm;

FIGS. 13A to 13E show experimental results, wherein FIG. 13A shows shifted focal spot along x-axis, FIG. 13B shows actual focal spot after optimization, FIG. 13C shows shifted focal spot along y-axis, FIG. 13D shows profile view of FIG. 13B and FIG. 13A (in blue and red respectively), the plot shows a shift of 348 µm, FIG. 13D shows profile view of FIG. 13B and FIG. 13C (in blue and red respectively), the plot shows a shift of 667 µm, and FIG. 13E shows the profile view of FIGS. 13B and 13C (shift of 667 µm from the initial focus spot along the y direction).

DETAILED DESCRIPTION OF EMBODIMENTS

Figure 1:
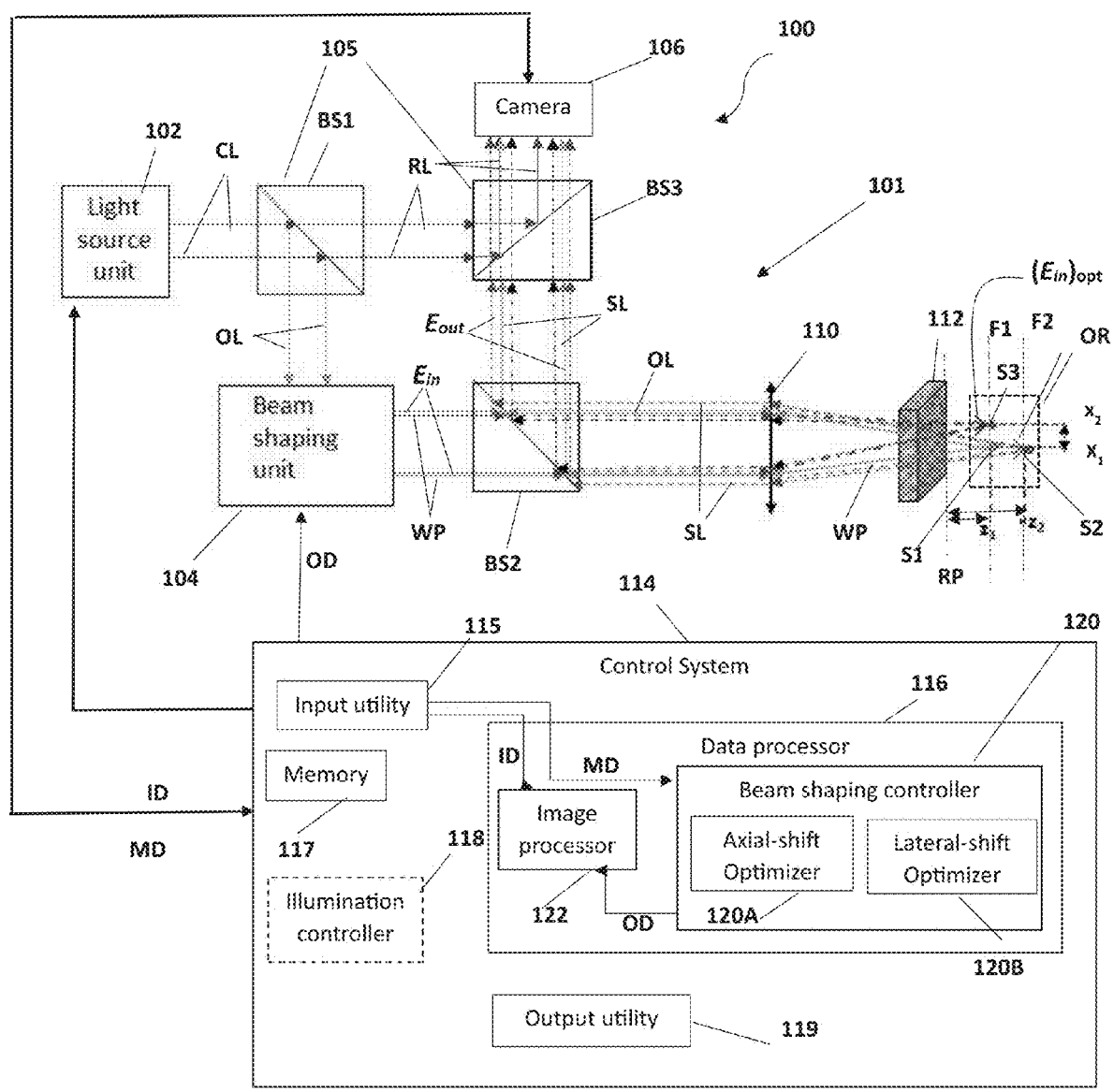
FIG. 1 shows schematically the configuration and operation of the system of the present disclosure for imaging an object through scattering medium.

Reference is made to FIG. 1 describing schematically a system 100 configured according to the principles of the present disclosure for use in imaging an object region OR through a scattering medium 112. For example, this may be imaging a biological tissue in a subject's body via skin.

The system 100 includes an imaging system 101 and a control system 114. The imaging system 101 includes a light source unit 102, a beam shaping unit 104 (e.g., a spatial light modulator (SLM)), an interferometric unit 105, and a detection unit 106 including at least one pixelated detector, e.g., a camera. The control system 114 is configured as a computer including inter alia such main functional utilities as input 115, memory 117, output 119 and data processor 116. As shown in the figure in dashed lines, the control system 114 may also include an illumination controller 118 as will be described further below.

The data processor 116 includes a beam shaping controller 120 and an image processor 122. As described below, the imaging system 101 is configured and operable to provide measured data MD indicative of amplitude and phase of light returned from the object in response to illumination and image data ID comprising structured data of the object being imaged.

The control system 114 is in data communication (via wires or wireless signal transmission of any known suitable type) with the imaging system 101 to receive and process output of the detector 106, i.e. measured data MD and image data ID. Also, the control system generates operational data OD and transmits it to the beam shaping unit 104.

Thus, the imaging system 101 defines an imaging channel and a measurement channel utilizing common light source and common detector. The interferometric unit 105, which defines the measurement channel, provides extraction, from light being detected by the detector, of the measured data MD indicative of the amplitude and phase of light returned from the object in response to illumination. The imaging channel provides extraction, from light being detected by the detector, of the image data ID indicative of the structured data of the object.

The control system 114, i.e., the beam shaping controller 120, analyses the measured data MD to generate operational data OD to the beam shaping unit 104. The operational data includes optimization data to optimize wavefront patterns of illumination to produce (simultaneously or sequentially) multiple illumination spots focused on a first array of focal planes at the object region and produce (simultaneously or sequentially) multiple illumination spots focused on a second array of lateral locations in each focal plane. The operational data OD is optimized for each location and each focal plane, such that the image data is indicative of a 3D structure of the object.

The light source unit 102 generates coherent light CL forming coherent illumination of at least one selected wavelength range. The coherent light CL from the light source is split by a beam splitter BS1 (of the interferometric unit 105) into a reference beam (e.g., off-axis reference beam) RL propagating towards the pixelated detector (camera) 106 via a beam splitter/combiner BS3 (of the interferometric unit 105) and into an object beam (e.g., on-axis object beam) OL which forms an input light propagating towards the object region OR via the beam shaping unit 104 and the scattering medium 112. The beam shaping unit 104 is controllably operable to affect the phase (and possibly also the intensity) of the input light to produce optimized wavefront patterns WP of the input light, i.e., of the object beam OL, which vary for different focal planes and different lateral locations, to thereby form optimized wavefront shaped coherent illumination propagating through the scattering medium 112 towards the object region OR.

In the example of FIG. 1, the optimized shaped object beam OL on its way to the scattering medium 112 interacts with the beam splitter/combiner BS2 which transmits (or reflects) the beam to the scattering medium, possibly via a lens unit 110 (including objective lens) located upstream of the scattering medium 112 (with respect to the general propagation path of the object beam). The scattering medium 112 is generally transmitting allowing light passage therethrough to the object region OR.

The inventors employ an adaptive optics scheme-based detection for wavefront compensation to focus light on the scattering medium. Assuming that behind the scattering medium 112 the object in the object region OR reflects/backward scatters some of the incident light, this light corresponds to an output light SL originated at the object region in response to the wavefront shaped coherent illumination WP and passed through the scattering medium 112 on the way back. This output light SL propagates along a reversed path (scattering medium 112, and possibly also objective lens unit 110 and beam splitter/combiner BS2) towards the camera 106, via the beam splitter/combiner BS3 where it is combined with the reference beam RL and the combined beam propagates to the camera, which detects incident light and generates measured data MD comprising amplitude and phase of the output light SL and also the image data ID. The latter can actually be generated by extracting the intensity data from the measured data MD. This measured data MD being detected by the camera 106 is indicative of an interference pattern between the reference beam RL and the output light SL which corresponds to the wavefront shaped coherent illumination that passed twice through the scattering medium.

As described above, the beam shaping controller 120, being in data communication with the camera 106 and with the beam shaping unit 104, is configured and operable to analyze the measured data MD being generated and produce operational data OD to the beam shaping unit 104. The operational data OD is indicative of optimized selectively varying wavefront patterns of the input light (object beam). More specifically, the technique of the present disclosure provides numerical optimization of the incident wavefront of the object beam for tuning and shifting of the focal plane of the illumination downstream of the scattering medium (axial tuning of the focused illumination) and lateral shifting of a focused illumination spot along the focal plane.

For example, FIG. 1 shows projection/focusing of the object beam onto multiple illumination spots—three such spots S1, S2 and S3, of a first array of focal planes in the object region OR—two such focal planes F1 and F2 being shown in the figure, at certain different z-distances from the scattering medium 112 and a second array of lateral locations in the same focal plane. In this example, the illumination spots/points S1 and S3 are at different lateral locations x1 and x2 in the same focal plane F1 at z1 distance from the scattering medium 112, and illumination spot/point S2 is located in a different focal plane F2 at z2 distance from the scattering medium 112.

The technique of the present disclosure utilizes optimization of the wavefront of the object beam OL to axially shift the focus to a new z-plane, e.g., F2 at the location z2 in FIG. 1. The beam shaping controller 120 includes an analyzer utility 120A which is configured and operable as an axial-shift optimizer capable of analyzing the measured data and determining the optimized wavefront shaping function to be applied to the input light OL to satisfy a predetermined condition of a relation between optical fields of the input light and the output light, $E_{in}$ and $E_{out}$, with respect to each desired focal plane downstream of the scattering medium.

The technique of the present invention takes advantage of a convergence condition corresponding to similarity of the spatial intensity pattern of the input light field and the output light field being reflection/scattering from a location of interaction with the input light field, which condition corresponds to the output light field origination at the focal plane of the input light field. Considering the input light interaction with the scattering medium, such condition is true for the last plane of the scattering medium with respect to the propagation path of the input light, a so-called "reference plane" RP, i.e. z=0, and also x,y=0.

In case of axial tuning of the focal plane, the axial-shift optimizer 120A utilizes representation of the output light field $E_{out}$ originated at (symmetrically backscattered from) a focal plane at a z-distance from the reference plane defined by the scattering medium (e.g., distance $z_1$ or $z_2$ from the scattering medium), as $g(z) \cdot E^{\oplus}_{out}$, wherein g(z) is a predetermined function describing free space light propagation between the scattering medium and the desired focal plane in the object region. Utilizing the function g(z), the optimizer 120A determines an optimization function to be applied to the input light OL to satisfy the condition $(E_{in})_{opt} = g(z) \cdot E^{\oplus}_{out}$ between the optimized input light field, $(E_{in})_{opt}$, and the representation of the output light field $g(z) \cdot E^{\oplus}_{out}$.

Also, the technique of the present disclosure provides for laterally tuning and shifting the focal location in the focal plane behind the scattering medium to provide multiple illumination spots of a second array in the focal plane. To this end, the beam shaping controller 120 includes an analyzer 120B which is configured and operable as a lateral-shift optimizer capable of analyzing the measured data and determining an optimization factor to be applied to the input light $E_{in}$ to project the illumination spot on a laterally shifted location in the focal plane. For example, as shown in FIG. 1, the illumination spot F3 location $x_2$ is laterally shifted from location $x_1$ of illumination spot F1. The optimization factor is a linear phase gradient, as will be described in detail further below.

The above described technique of the present disclosure provides that the wavefront shaped coherent illumination includes (simultaneously or sequentially provided) multiple illumination spots focused on a first array of focal planes at the object region and (simultaneously or sequentially) focused on a second array of lateral locations in each focal plane. The output light originated at the object region in response to the multiple illumination spots is analyzed by the image processor 122 to extract structural data of the object being indicative of a 3D structure of the object.

Thus, the technique of the present disclosure allows to perform imaging of the spatial object region OR substantially simultaneously. The number of spots in the formed array (second array) is the imaging resolution at the detector. It should be understood that the technique of the present disclosure significantly reduces the scanning procedure. Multiple focal planes can be imaged simultaneously by a corresponding array of focal spots, without the need to perform z-axis scan. As for the x-y-plane scan of the object in order to scan the space between the points (illumination spots of the second array), this is much less than the scan of the entire field of view.

Figure 2:
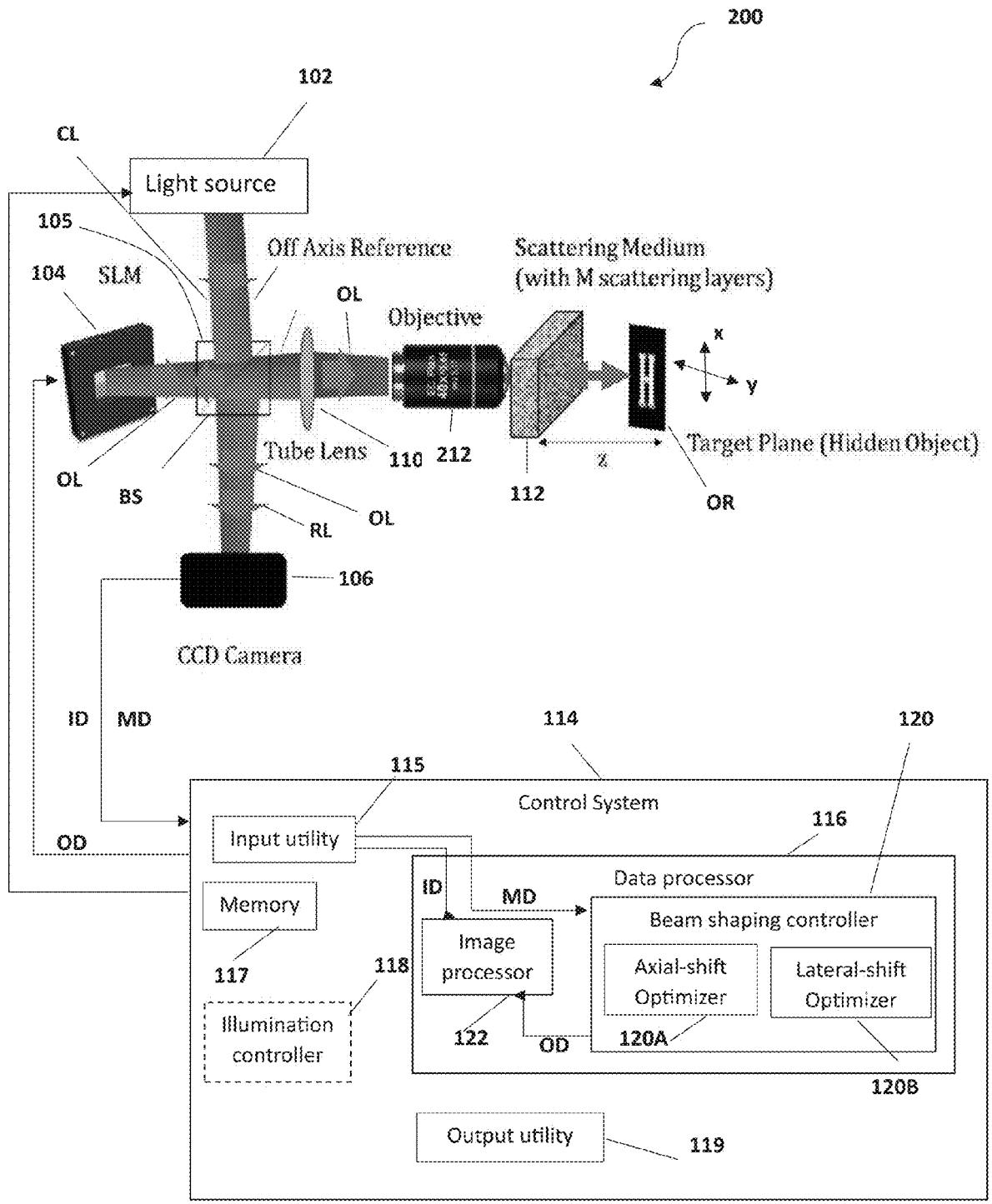
FIG. 2 shows schematically a specific non-limiting example of the configuration of the system suitable to implement the technique of the present disclosure for imaging an object through scattering medium.

Reference is made to FIG. 2 showing a specific not limiting example of the configuration of a system 200 according to the present disclosure for use in imaging an object through a scattering medium. To facilitate understanding, the same reference numbers are used to identify functionally similar elements which are common in all the examples.

System 200 is generally similar to the above-described system 100, namely includes an imaging system 101 and the control system 114. The imaging system 101 includes a light source 102, a beam shaping unit 104 including an SLM, an interferometric unit 105, and a pixelated detector (camera) 106. The interferometric unit 105 includes a beam splitter/combiner BS. In this example, the lens unit 110 is provided and includes an objective lens unit and a tube lens.

Coherent light CL emitted by the light source 102 is split by beam splitter/combiner BS into an off-axis reference beam RL propagating towards the camera 106 and an on-axis object beam OL forming the input light propagating towards the SLM 104. The SLM 104 affects the phase (and possibly also intensity) of the object beam OL according to the optimization provided by the operational data generated by the beam shaping controller 120 as described above and the so-produced optimized wavefront pattern of the object beam propagates (via the lens unit 110) to the scattering medium 112 which transmits this light towards the object region OR. The tube lens spatially filters out higher-order diffraction induced by the light interaction with the SLM, and an objective 212 applies a focusing effect to focus the object beam on a desired focal plane/target plane behind/hidden by the scattering medium 112.

As described above, projection of the object beam onto illumination spots at different axial and lateral locations can be implemented sequentially (in sequential measurement/imaging sessions) or simultaneously (in a single measurement/imaging session). It should be understood that the simultaneous projection onto multiple illumination spots having differently optimized wavefront patterns can be implemented by separate operation of different sub-arrays of the matrix of light affecting elements of the SLM, by corresponding different data pieces of the operational data.

It should be noted that the optimization procedure performed by analysis of the measured data (utilizing iterative fitting procedure) can be performed sequentially for different sub-array of the light affecting element, and then all the sub-arrays are operated simultaneously with the respective optimized operational data pieces to produce simultaneous projection of the multiple illumination spots. Further, it should also be noted that, alternatively or additionally, simultaneous acquisition of multiple images from multiple illumination spots at different focal planes (first array) and/or different locations in the same focal plane (second array) can be implemented in wavelength multiplexing mode, e.g., utilizing three different wavelengths (R, G and B).

Figure 3:
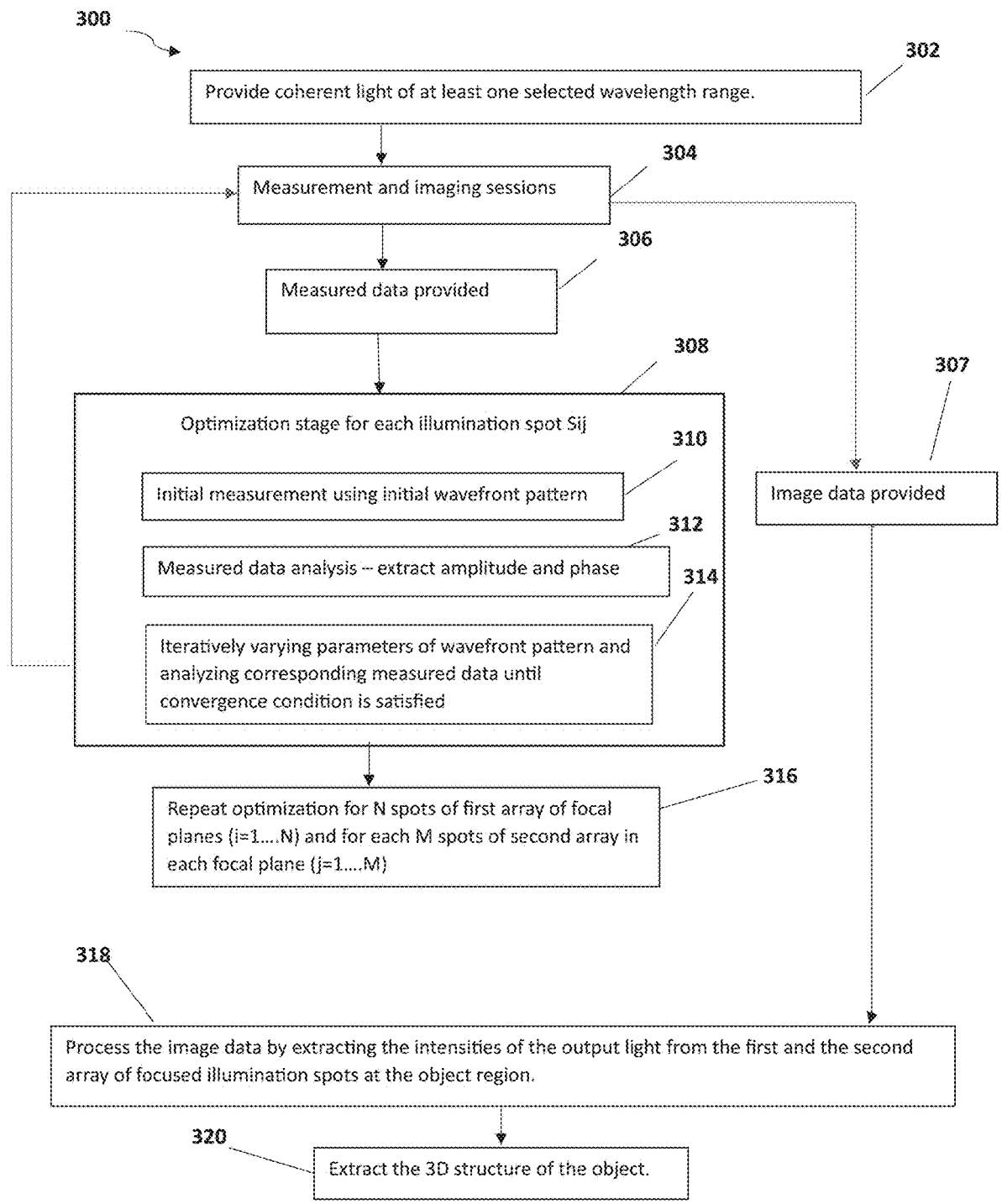
FIG. 3 is a flow diagram exemplifying a method of the present disclosure for imaging an object through scattering medium.

The operation of the system for imaging the object through the scattering medium is described with reference to FIG. 3 exemplifying a flow diagram 300 of the system operation. The method starts with operation of the light source 102 to provide coherent light of at least one selected wavelength range (step 302) and performing measurement and imaging sessions (step 304) during which measured and image data are provided (steps 306 and 307).

As described above the measured and image data are actually provided concurrently being contained in the output of the common pixelated detector. However, the results of analysis of the measured data obtained from the measurement session are used to "guide" the imaging session (i.e. by data indicative of optimized waveform patterns for the illumination spots, respectively). Alternatively, data indicative of the optimized waveform patterns for all the spots can be determined in multiple measurement sessions or in the single measurement session using sub-arrays of the light affecting elements of the SLM as described above, and this data is properly stored and then used for performing the imaging session(s). Yet another option is by concurrently performing the measurement and imaging sessions (while optimizing the waveform patterns by analyzing the measured data) and then image data pieces corresponding to non-optimized waveform patterns are disregarded from being used for the 3D structure reconstruction.

Thus, the measured data is analyzed (step 308). This is actually the optimization stage during which the waveform pattern is optimized for each illumination spot $S_{ij}$ from the total number N×M of illumination spots to be provided in N focal planes, each including M spots. This optimization stage is as follows: Initial measurement session is performed using initial waveform pattern, i.e. initial parameters/conditions of the beam shaping unit (step 310). The beam shaping controller 120 performs measured data analysis to extract the amplitude and phase of the output light returned from the object (step 312) and analyze the corresponding light output field over the input light field (object beam). Upon identifying that the output light field does not meet the convergence condition with the input light field, the beam shaping controller generates iteratively varying parameters of the beam shaping unit and thus of the waveform pattern of the input light which are used in successive measurement sessions until the measured data satisfies the convergence condition (step 314). The corresponding waveform pattern is used in the imaging session, or the corresponding image data piece is extracted for use in the further image processing. The optimization procedure is repeated/performed (step 316) for N spots of the first array of focal planes (i=1 . . . N) and for M spots of the second array in each focal plane (j=1 . . . M). The image data is processed (step 318) by extracting the intensities of the output light from the first and the second array of focused illumination spots at the object region, and by this the 3D structure of the object is extracted (step 320).

It should be noted and will be described further below that according to the inventors' findings, the convergence condition is different for the axially shifted spots and for the laterally shifted spots.

It should be noted that the technique of the present disclosure can be advantageously used to improve the performance of the "defocused approach" [15,16] for inspection objects behind scattering medium. According to this approach, several images can be acquired having different amounts of defocusing allowing reconstruction of a high-resolution image despite the fact that the object is positioned behind a scattering medium similar to a biological tissue. This approach was demonstrated experimentally [15,16] specifically for imaging of bone fractures in orthopedic applications. The realization of that concept was obtained by time tuning the lens and finding the proper defocusing. However, there was no feedback allowing to know whether the applied defocus is the right one or not. This yielded a reconstruction error. Using the technique of the present disclosure in the "defocused" imaging system, provides optical feedback allowing to identify exactly the amount of defocusing and even performing different amount of defocusing for different lateral locations along the inspected field of view in order to properly optimize the collected data.

In the following, the principles of the technique of the present disclosure are detailed.

The bi-directional transmission through photonic systems is governed by the universal Lorentz reciprocity (or the Helmholtz reciprocity), which states that light propagating along a reversed path experiences the same transmission coefficient as in the forward direction, independent of the path complexity or the presence of loss [13]. In the linear regime, this suggests a definite relation, or symmetry, between the forward and the backward transmission when interchanging the source and detector. This symmetry is also valid for a forward and backward scattering of light in scattering media. Recently Lee et al. [2] proved this point experimentally in a disordered medium like a multimode fiber. They measured the transmission matrix both in the forward and backward direction and found that indeed the symmetry exists, and the backward transmission matrix is the transpose of the forward transmission matrix.

The inventors employ an adaptive optics scheme-based detection for wavefront compensation to focus light inside the scattering medium. In this scheme, the inventors optimize the input wavefront applied to a scattering medium by measuring the phase of the light that passed twice through the same medium (on the way forward and on the way back). To obtain the encoded inverse wavefront that will be focused after passing the above-mentioned scattering medium the inventors use the following modeling: it is assumed that the scattering medium can be modeled by a sequence of operator multiplications while the first is an operator of a random phase and the second is an operator of short free-space propagation of distance of dz being the average scattering length in the inspected tissue. This couple of operators is repeated until the number of repeats equals M=L/dz where L is the distance of the target behind the media from the point of illumination, as illustrated in FIG. 4.

Thus, by modeling the 1D case due to cause of simplicity, the forward scattering matrix A can be written as:

$$A = \left[ [F_{ij}]^* \begin{bmatrix} e^{-i\pi\lambda dz \mu_j^2} & \cdots & 0 & 0 \\ \vdots & \ddots & 0 & \vdots \\ 0 & \cdots & e^{-i\pi\lambda dz \mu_j^2} & 0 \\ 0 & 0 & 0 & e^{-i\pi\lambda dz \mu_j^2} \end{bmatrix} [F_{ij}] \begin{bmatrix} P_{11} & \cdots & 0 & 0 \\ \vdots & \ddots & 0 & \vdots \\ 0 & \cdots & P_{N-1N-1} & 0 \\ 0 & 0 & 0 & P_{NN} \end{bmatrix} \right]^M \quad (1)$$

Free Space Propagation Matrix ; Phase Scattering Matrix where F is the DFT matrix with $[F_{ij}]$ and $[F_{ij}]^*$ being Fourier and inverse Fourier matrix, $\lambda$ is the optical wavelength, z is the free space distance, dz is the averaged free optical path (average distance between scattering events), P is a random phase factor (of the scatterer) and $\mu$ is the spatial frequency. Hence, $$E_{out_j}(x_j) = A^t * A * E_{in_j}(x_j) \quad (2)$$

It is to be noted that the matrix A is unitary since it is the product of the multiplication of two unitary matrices. The operator matrix A was applied twice as there is double passing through the scattering medium (on the way forward and on the way back). On the way back, the scattering is in inverse order, and therefore the transpose operation was applied on the matrix A. The inventors want to find the input field distribution vector $E_{in}$ (which e.g., can be a phase-only distribution) such that after one passage a focus is obtained, i.e., the operator A produces a delta function in the middle of the spatial axis (zero position coordinate):

$$\begin{bmatrix} 0 \\ 0 \\ 1 \\ 0 \\ 0 \end{bmatrix} = A * E_{in_j}(x_j) \quad (3)$$

Thus, one can extract that:

$$(A^t)^{-1} * E_{out_j}(x_j) = A * E_{in_j}(x_j) = \begin{bmatrix} 0 \\ 0 \\ 1 \\ 0 \\ 0 \end{bmatrix} \quad (4)$$

and therefore:

$$E_{out}(x_j) = A^t \begin{bmatrix} 0 \\ 0 \\ 1 \\ 0 \\ 0 \end{bmatrix} = A^t_{N/2,j} \quad (5)$$

where N is the number of spatial sampling points along the output axis.

From Eq. (3) $E_{in}$ equals to the middle column of the matrix operator of inverse A:

$$E_{in_j}(x_j) = A^{-1} * \begin{bmatrix} 0 \\ 0 \\ 1 \\ 0 \\ 0 \end{bmatrix} = A^{-1}_{\frac{N}{2},j} \quad (6)$$

Since A is a unitary matrix then there is a known relation between A transpose ($A^t$) and inverse $A(A^{-1})$.

$$A^{-1} = A* \quad (7)$$

where * applied on a matrix A denotes its conjugate transpose. By combining Eqs. (5), (6) and (7), it can be written:

$$E_{out_j}*(x_j) = E_{in_j}(x_j) \quad (8)$$

Hence, the desired $E_{in_j}(x_j)$ is obtained, to be applied on the SLM for having a focused spot after the first passage through the medium. A pictorial representation of the above presented mathematical steps can be seen as two steps described in FIGS. 5A and 5B. FIG. 5A shows that there exists an ideal-shaped wavefront that produces a focused spot behind the thick scattering media and FIG. 5B shows that the focused light passes through the same scattering medium in a backward scattering direction. The output wavefront measured will be the conjugate of the ideal shaped wavefront. This would be the condition to obtain focus after the first pass through the media.

Since it is known from the optical feedback that if there is a focused spot behind the scattering medium then it is also possible to perform a controlled defocusing as required by the proposed image reconstruction algorithm previously developed by the inventors [16,17]. By projecting an array of such focused/defocused spots in space one can perform imaging of the spatial region of interest without the need to perform scanning of the object with the focused spot.

Figure 6A:
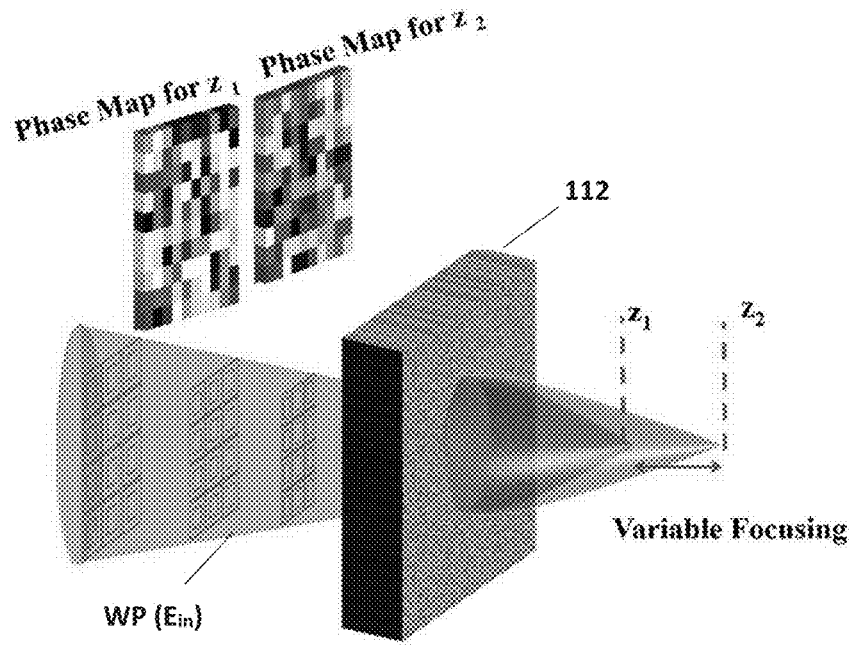
FIGS. 6A and 6B schematically illustrate the principles of optimization of the wavefront shaped coherent illumination according to the present disclosure, where

The present disclosure provides for axially tuning the focus. In the following, the theoretical foundation for axial tuning of the focal point after the diffuser (scattering medium) is described. Reference is made to FIG. 6A illustrating the axial tuning of focus on two different planes ($z_1$ and $z_2$) using the corresponding optimized phase map.

The matrix T denotes the free-space propagation of distance z after the scattering medium with a thickness of (dzM). The medium has an M layer of scattering. Now, the total forward scattering with the additional propagation of distance z is given by:

$$S = [F_{ij}]^* \begin{bmatrix} e^{-i\pi\lambda z\mu_j^2} & \cdots & 0 & 0 \\ \vdots & \ddots & 0 & \vdots \\ 0 & \cdots & e^{-i\pi\lambda z\mu_j^2} & 0 \\ 0 & 0 & 0 & e^{-i\pi\lambda z\mu_j^2} \end{bmatrix} [F_{ij}] * A = T * A \quad (9)$$

$$E_{out}(x_j) = A^t * T^t * T * A * E_{in_j}(x_j) \quad (10)$$

where $E_{out}$ is the electrical field of light sensed by the holographic wavefront sensor.

As discussed before, the assumption is that the electrical field that is back reflected passes the same medium but in the opposite sequence. This assumption can be made because the focus existing on the object is in the center of the field of view (and thus the way back of the backscattered light is exactly symmetric to the way in, but in the opposite sequence of events).

It is assumed that there is focus after 1st pass and thus:

$$\begin{bmatrix} 0 \\ 0 \\ 1 \\ 0 \\ 0 \end{bmatrix} = T * A * E_{in_j}(x_j) \quad (11)$$

Here, $$\begin{bmatrix} 0 \\ 0 \\ 1 \\ 0 \\ 0 \end{bmatrix}$$

means that a focus is obtained in the center of the field of view where $E_{in_j}$ is the electrical field that is sent into the scattering medium after being shaped by the SLM.

$$E_{in_j}(x_j) = A^{-1} * T^{-1} * \begin{bmatrix} 0 \\ 0 \\ 1 \\ 0 \\ 0 \end{bmatrix} \quad (12)$$

Then, the output field (as detected by the holographic wavefront sensor/interferometric unit) is given by:

$$E_{out}(x_j) = A^t * T * \begin{bmatrix} 0 \\ 0 \\ 1 \\ 0 \\ 0 \end{bmatrix} \quad (13)$$

Hence, it can be written:

$$(T)^{-1} * (A^t)^{-1} * E_{out}(x_j) = T * A * E_{in_j}(x_j) = \begin{bmatrix} 0 \\ 0 \\ 1 \\ 0 \\ 0 \end{bmatrix} \quad (14)$$

Thus, $$A * E_{in_j}(x_j) = (T)^{-1} * \begin{bmatrix} 0 \\ 0 \\ 1 \\ 0 \\ 0 \end{bmatrix} \quad (15)$$

$$(A^t)^{-1} * E_{out_j}(x_j) = T * \begin{bmatrix} 0 \\ 0 \\ 1 \\ 0 \\ 0 \end{bmatrix} \quad (16)$$

Due to the unitary property of the matrix A, the following is true:

$$A^{-1} = A* \quad (17)$$

where * is the complex conjugate as the matrix S is complex.

Thus, by dividing Eq. (15) by the conjugate of Eq. (16) it follows that:

$$E_{in_j}(x_j)/E_{out_j}^{\oplus}(x_j) = T^{-1} * \begin{bmatrix} 0 \\ 0 \\ 1 \\ 0 \\ 0 \end{bmatrix} / T^{\oplus} * \begin{bmatrix} 0 \\ 0 \\ 1 \\ 0 \\ 0 \end{bmatrix} = g(Z) \quad (18)$$

where ⊕ is the conjugate of the respective matrices. g(z) is a known function of z. Thus, the condition for convergence is:

$$E_{in_j}(x_j) = g(z) * E_{out}^{\oplus}(x_j) \quad (19)$$

$$g(z) = T^{-1} * \begin{bmatrix} 0 \\ 0 \\ 1 \\ 0 \\ 0 \end{bmatrix} / T^{\oplus} * \begin{bmatrix} 0 \\ 0 \\ 1 \\ 0 \\ 0 \end{bmatrix} \quad (20)$$

The inventors now calculate:

$$C_1 = T * \begin{bmatrix} 0 \\ 0 \\ 1 \\ 0 \\ 0 \end{bmatrix} \quad (21)$$

The free-space propagation matrix T is given by:

$$T = [F_{ij}]^* \begin{bmatrix} e^{-i\pi\lambda z \mu_j^2} & \cdots & 0 & 0 \\ \vdots & \ddots & 0 & \vdots \\ 0 & \cdots & e^{-i\pi\lambda z \mu_j^2} & 0 \\ 0 & 0 & 0 & e^{-i\pi\lambda z \mu_j^2} \end{bmatrix} [F_{ij}] \quad (22)$$

It should be noted that, considering, imaging of a region of a biological tissue via a skin constituting the scattering/diffusing medium, the illumination is focused on planes behind this medium where the object is located. The z-position of the focal plane is behind the diffusing medium where there is no dispersion. The object is not adjacent to the scattering medium, but a certain distance of freedom is found behind it. Therefore, some scan is needed.

So, in Eq. (21), the DFT of a delta function is calculated, which is centered at the middle of the axis which gives a vector with all elements being ones. The coordinates of the DFT are in the frequency domain. After the operation of DFT on the delta function, the following result is obtained in the spatial domain x:

$$F * \begin{bmatrix} 0 \\ 0 \\ 1 \\ 0 \\ 0 \end{bmatrix} = \begin{bmatrix} 1 \\ 1 \\ 1 \\ 1 \\ 1 \end{bmatrix} \quad (23)$$

In the next step, the DFT* of the Fresnel matrix is calculated, which is multiplied by the vector of ones obtained in Eq. (15)

$$C_1 = F^* \begin{bmatrix} e^{-i\pi\lambda z \mu_j^2} & \cdots & 0 & 0 \\ \vdots & \ddots & 0 & \vdots \\ 0 & \cdots & e^{-i\pi\lambda z \mu_j^2} & 0 \\ 0 & 0 & 0 & e^{-i\pi\lambda z \mu_j^2} \end{bmatrix} \begin{bmatrix} 1 \\ 1 \\ 1 \\ 1 \\ 1 \end{bmatrix} F^* \begin{bmatrix} \vdots \\ e^{-i\pi\lambda z \mu_j^2} \\ \vdots \end{bmatrix} \begin{bmatrix} \vdots \\ e^{i\frac{\pi x_j^2}{\lambda z}} \\ \vdots \end{bmatrix} \quad (24)$$

Using the same computation, one obtains the following:

$$T^{\oplus} * \begin{bmatrix} 0 \\ 0 \\ 1 \\ 0 \\ 0 \end{bmatrix} = \begin{bmatrix} \vdots \\ e^{-i\frac{\pi x_j^2}{\lambda z}} \\ \vdots \end{bmatrix} \quad (25)$$

Similarly, the following value can be found:

$$T^{-1} * \begin{bmatrix} 0 \\ 0 \\ 1 \\ 0 \\ 0 \end{bmatrix} = \begin{bmatrix} \vdots \\ e^{i\frac{\pi x_j^2}{\lambda z}} \\ \vdots \end{bmatrix} \quad (26)$$

Thus, after putting the value of Eq. (25) and (26) in Eq. (19) one can obtain the condition for convergence as a function of the free space propagation distance:

$$E_{in_j}(x_j) = K * e^{i\frac{2\pi x_j^2}{\lambda z}} * E_{out}^{\oplus}(x_j) \quad (27)$$

where K is a constant.

Figure 6B:
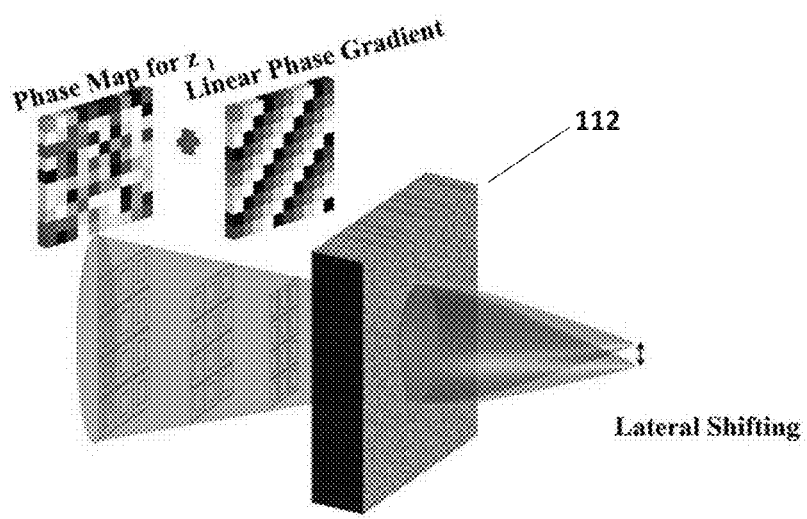

In the following, the lateral focal location tuning is described. Reference is made to FIG. 6B illustrating the lateral shifting of focus by applying a linear phase gradient to the optimized phase map for $z_1$. Tuning the lateral location means that Z=0, i.e., there is only the scattering medium and no free space propagation. Also, since now the focus will not be exactly in the center, the assumption of Eq. (8) is no longer valid (i.e., focus is obtained in a non-zero position coordinate of the spatial axis). The inventors use the theory of variations and assume that the condition of Eq. (2) is violated only slightly since the lateral deviation of the focal position from the center of the field of view is small with respect to the field of view. Thus, instead of Eq. (2) it follows that:

$$E_{out_j}(x_j) = A' * \exp\left(\frac{2\pi i}{\lambda} \frac{dx}{dzM} x_j\right) * A * E_{in_j}(x_j) \quad (28)$$

where the lateral shift of the focus is denoted by dx. The inventors assume that this shift is small and due to this shift, the linear phase is generated in $E_{out_j}$ because shift in the far field is equivalent to linear phase in the spatial domain. Since dx is small it will be still assumed that the operator applied on the light back-scattered from the object to the input plane is still A' as before. The laterally shifted focus implies that:

$$E_{in_j}(x_j) = (A)^{-1} * \begin{bmatrix} 0 \\ 1 \\ 0 \\ 0 \\ 0 \end{bmatrix} \quad (29)$$

and

-continued $$E_{out}(x_j) = A^t * \begin{bmatrix} 0 \\ 1 \\ 0 \\ 0 \\ 0 \end{bmatrix} \exp\left(\frac{2\pi i}{\lambda} \frac{dx}{dzM} x_j\right) \quad (30)$$

Thus, the final result will be:

$$E_{in_j}(x_j)/E_{out_j}(x_j) = \quad (31)$$

$$(A)^{-1} * \begin{bmatrix} 0 \\ 1 \\ 0 \\ 0 \\ 0 \end{bmatrix} \Big/ A^t * \exp\left(\frac{2\pi i}{\lambda} \frac{dx}{dzM} x_j\right) * \begin{bmatrix} 0 \\ 1 \\ 0 \\ 0 \\ 0 \end{bmatrix} = \exp\left(-\frac{2\pi i}{\lambda} \frac{dx}{dzM} x_j\right)$$

As before, the inventors assumed that A is unitary and orthogonal and thus:

$$A = (A^t)^{-1}$$

Thus, in the convergence process, each step will allow a phase deviation between $E_{in_j}(x_j)$ and $E_{out_j}(x_j)$ according to the expression of Eq. (31).

The iterations can be performed using any known suitable technique. For example, Particle Swarm Optimization Scheme (PSO) can be used to perform the iterations. It is a stochastic optimization technique that mimics the social behavior of birds flocking together or fish schooling. PSO finds an optimum solution for a problem by iteratively improving the solution from a set of candidate solutions being random guess solutions to a problem. These random solutions are called particles. Each particle is assigned a 'position' and a 'velocity' vector. The search space is known as 'swarm'. Hence, the name PSO. The inventors optimize the $E_{in}$ (which are random phase masks applied on SLM) using PSO to increase the cost function which in turn will focus light after the first pass through the medium.

As mentioned earlier, the inventors have demonstrated the validity of the technique of the present disclosure by simulation showing that indeed it is possible to focus and shift the focus axially and laterally. In addition to that, the inventors also performed experiments. The results of both simulation and experiments are described in the following.

Simulations were performed in MATLAB. The inventors followed the modeling as proposed and implemented by Zhu et al. [11]. In the case of the present disclosure, a thick scattering medium of thickness L is modeled by a stack of M random uncorrelated phase plates followed by a small angular spectrum propagation. The distance between each phase plate (dl) such that L=M·dl. It is assumed that (i) the refractive index contrasts are low which guarantees that the backward scattering is negligible, (ii) the diffuser thickness is smaller than the transport mean free path, (iii) the diffuser's absorption is negligible. In the simulation, the inventors show that it is possible to focus light inside a thick diffuser. To this end, the cost function is defined as the phase correlation between the input wavefront and that of the conjugate of the output wavefront as described by Eq. (10) described further below, Also, the inventors show possibility to laterally shift the obtained focus by multiplying the optimized wavefront with linear phase gradient, and to axially shift the focus in the z plane where z is the distance after the medium for which the cost function is described in Eq. (27).

Simulations were done for a total of 100 variables, being the input modes, whose values change from 0 to 2 m. The optimization scheme used was Particle Swarm Optimization mentioned above. The number of particles or the random phase mask of (10×10) was 20. MaxIt=100, the medium is modeled to be 1 mm thick with 5 scattering layers with a spacing of 142.8 μm. The correlation function increases to 0.95 in 100 iterations which include 20 iterations of each swarm. Hence, the total number of iterations used is 2000.

Figure 7A:
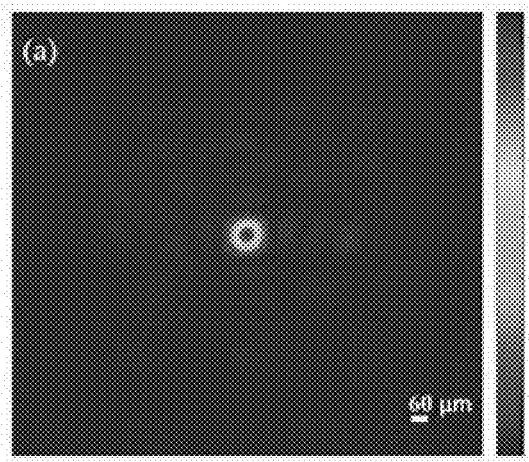
Figure 7B:
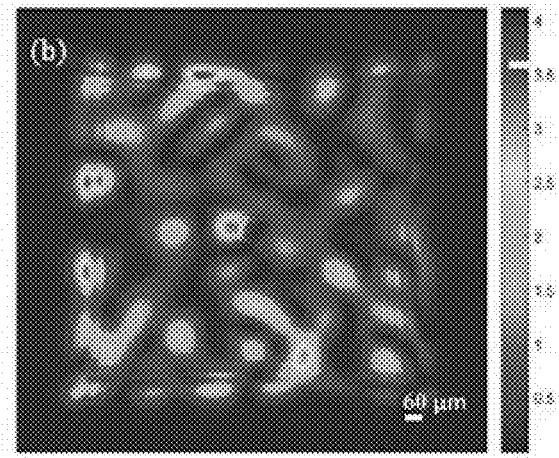
Figure 7C:
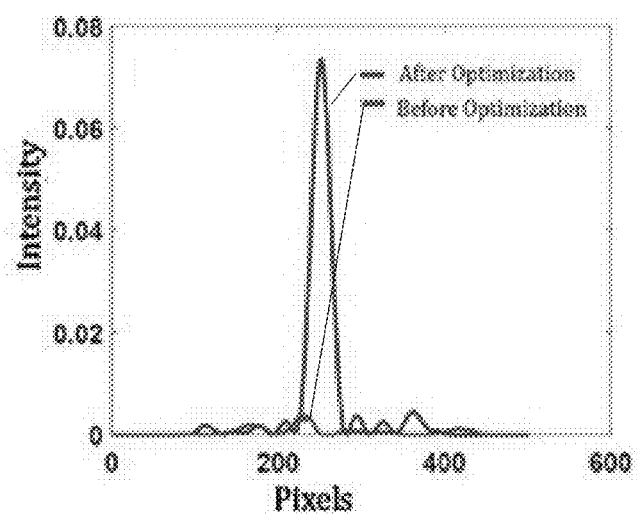
Figure 8A:
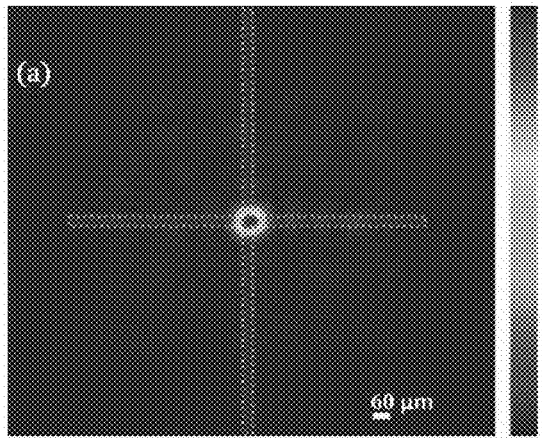
Figure 8B:
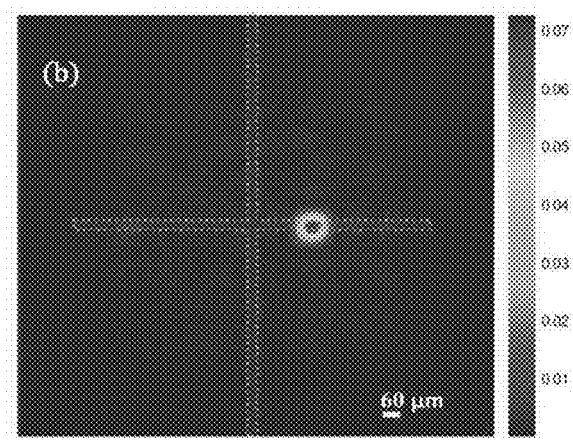
Figure 8C:
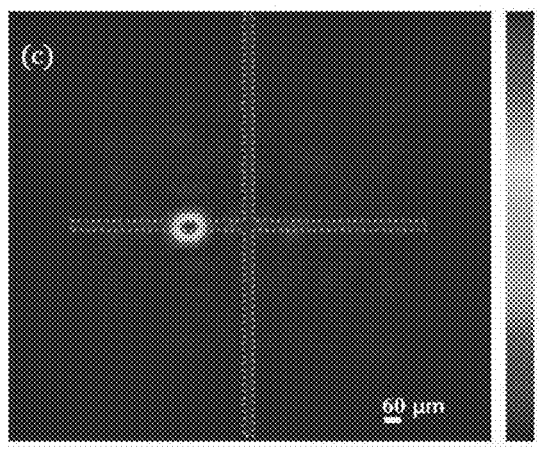

FIGS. 7A to 7C show the simulation result of focusing light right through the thick medium. FIGS. 7A and 7B show the speckle intensity on the plane in the first pass through the medium. FIG. 7A shows the focus obtained after optimization when the diffuser is illuminated with the correct phase mask that cancels the scattering effects of the diffuser to obtain a strong focus non-invasively. FIG. 7B shows the scattered speckle pattern on the last plane of the diffuser when it is illuminated with a plane wave, before optimization. FIG. 7C shows the intensity profile along an axis for both FIG. 7A and FIG. 7B marked in blue and red, respectively. The intensity profile in FIG. 8C shows that the peak to background ratio (pbr) has improved by 43 times. The size of the focal spot obtained is about 61 μm. The scattering medium behaves like a lens of focal length 1 mm with a pupil size of 10 μm which is the effective area of illumination on the scattering medium. Hence, the N.A of this scattering lens is 0.005, with spot size not smaller than (λf/D=53 μm). The simulation agrees with this concept as well, as the simulation resulted in a spot of size 61 μm.

Figure 8D:
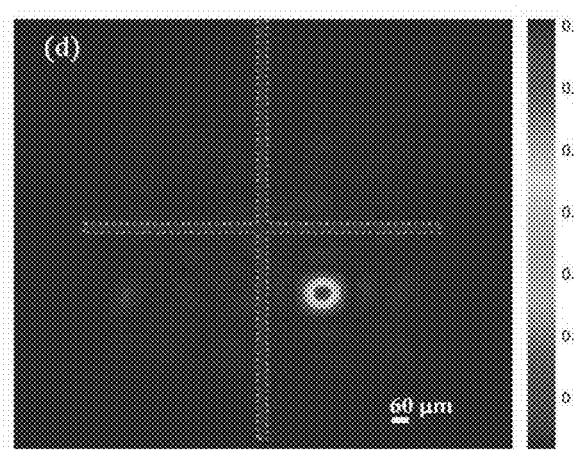

The inventors proceed further in shifting the focus obtained laterally by multiplying the phase mask obtained through optimization with the required phase gradient phase mask (Eq. (31)). The simulation results of shifting the focus at the last diffuser plane are shown in FIGS. 8A to 8D. To understand the shift, in each image a cross wire is added which is centered on each image. FIG. 8A shows the focus at the center, FIG. 8B shows a lateral shift in positive x-axis of about 61 μm when the optimized mask is multiplied by a linear phase shift in positive x-direction FIG. 8C shows a lateral shift in negative x-axis of about 61 μm when the optimized mask is multiplied by a linear phase shift in negative x-direction, FIG. 8D shows combined lateral shift in x and y of about 62 μm, respectively, when the optimized mask is multiplied by a linear phase shift both in x and y directions. In all the cases the pbr remains the same.

Axial shifting of focus is obtained at a plane z=0.5 mm from the last plane of the diffuser. This is achieved by utilizing the Eq. (27) as the cost function in the optimization.

Figure 9A:
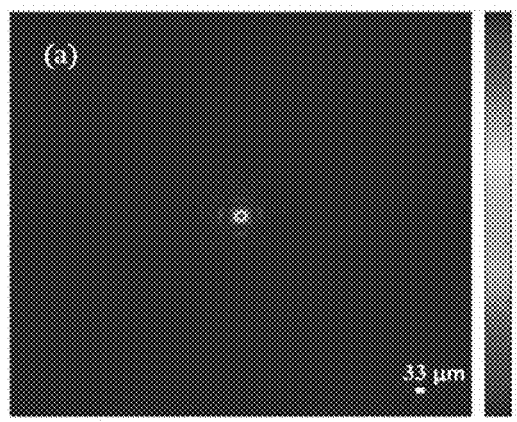
Figure 9B:
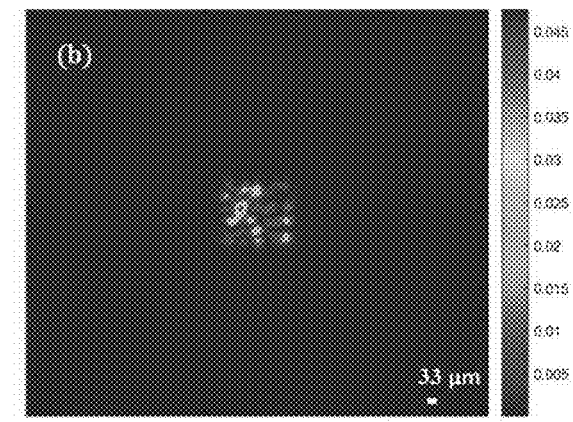
Figure 9C:
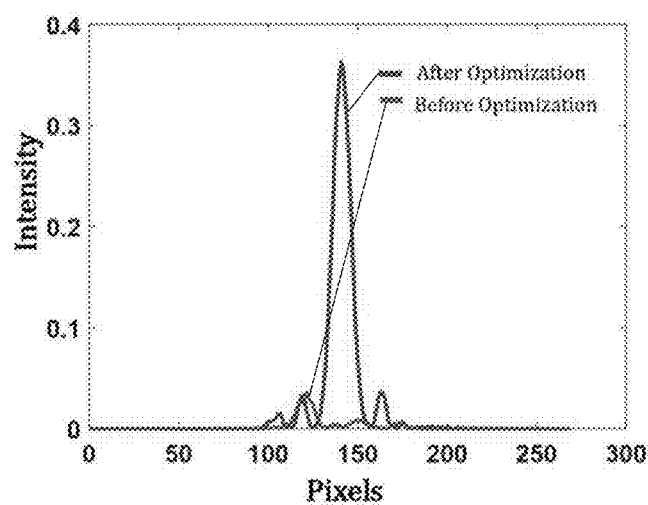

FIGS. 9A to 9C show the results of simulating axial shifting of the focal spot. FIG. 9A shows the focus obtained on a plane z=0.5 mm from the last plane of the diffuser when the diffuser is illuminated with the optimized mask. FIG. 9B shows the speckle pattern on the current z plane before optimization. The spot size in FIG. 9A is approximately 33 μm. The spot size is smaller because the inventors tune the system such that the beam travels an axial distance z=0.5 mm from the last scattering layer and focuses light. Hence, the effective NA is higher now compared to the case where z=0. FIG. 9C shows the profile view of the intensity pattern obtained in FIGS. 9A and 9B. In this example, the pbr in the focused case (FIG. 9A) is 30 times higher than in the scattered case (FIG. 9B).

The inventors demonstrated focusing of light through a scattering medium (Thorlabs Ground Glass Diffuser with 600 Grits). Here the inventors also show the capability of the technique to scan the spot both axially and laterally.

Figure 10:
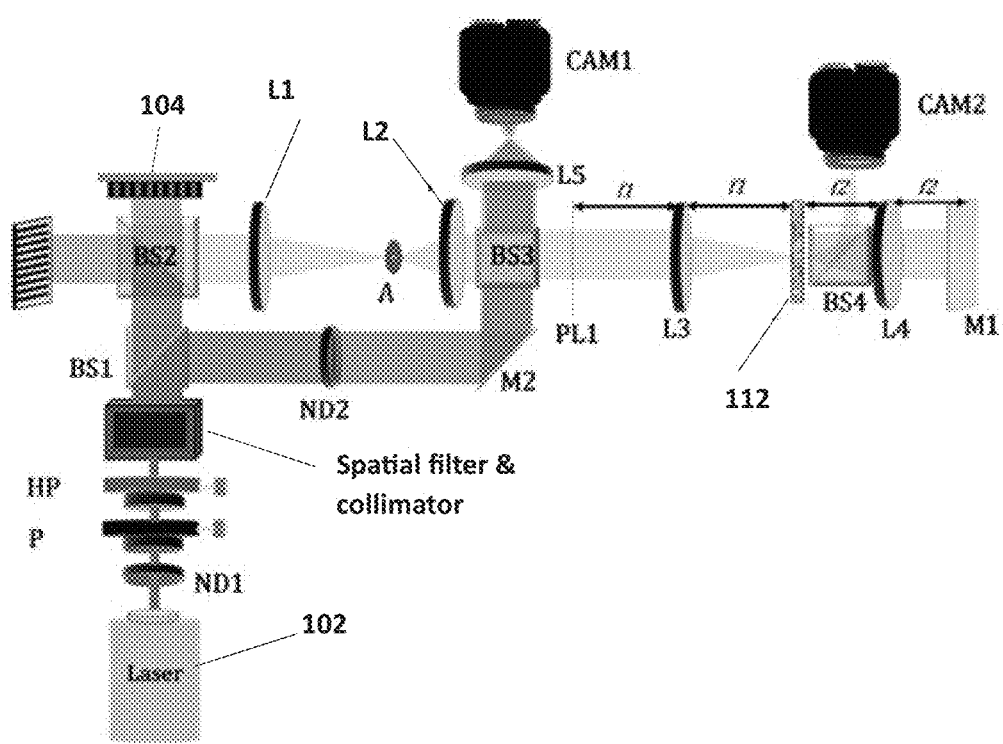
FIG. 10 shows schematically an exemplary experimental setup used to demonstrate the technique of the present disclosure.

FIG. 10 shows the schematic of the experimental setup used. The experimental setup consists of a 532 nm spatially filtered collimated laser illuminating the phase only SLM (Holoeye-Pluto 2 (1080×1920), pixel size 8 μm). The SLM surface is imaged to the plane PL1 using a 4f system that consists of tube lens L1 (f=200 mm), tube lens L2, (f=100 mm), and an aperture A in the Fourier plane of lens L1 to filter out higher-order diffraction from the SLM (beam shaping unit 104). Further, the diffuser 112 is placed at the focal point of the objective lens L3 (f=150 mm). The imaging lens L4 (f=50 mm) performs the Fourier Transform of the back surface of the diffuser 112 to the Mirror M1 which reflects the light back through the same diffuser.

Imaging lens L5 of the camera unit CAM1 images the plane PL1 on the CAM1 (basically lens L5 images the output speckle reaching on the plane PL1 after the dual pass through the diffuser 112). The camera CAM1 is placed such that it is pixel to pixel matched with the SLM 104 projection on the plane PL1. The inventors use an off-axis reference beam to capture the interference pattern of the output speckles on camera CAM1 and process it using the off-axis holographic technique to retrieve the output speckle phase. This acts as feedback to the beam shaping controller to provide new operational data to the SLM 104. Camera CAM2 is placed at varying z distances from the diffuser 112 to verify whether focus is achieved at the desired location or not. However, any information from this camera is not used to modulate the input SLM phase.

In the first set of experiments, light is focused at a distance of 100 mm from the diffuser. The objective function is to optimize the wavefront to achieve desired focus in a non-invasively way as obtained from Eq. (27). The effective area illuminated on the SLM is 8.6 mm which is a square of 1080×1080 pixels. However, in the experiment, 27×27 pixels are binned as one pixel to reduce the computational load. Hence the effective size of the input matrix becomes 40×40. The optimization algorithm searches for the best solution that satisfies Eq. (27).

Figure 11A:
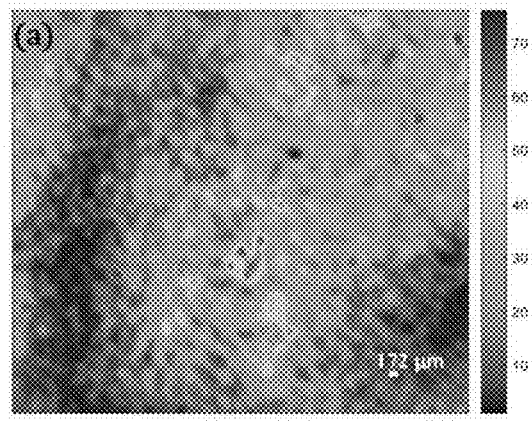
Figure 11B:
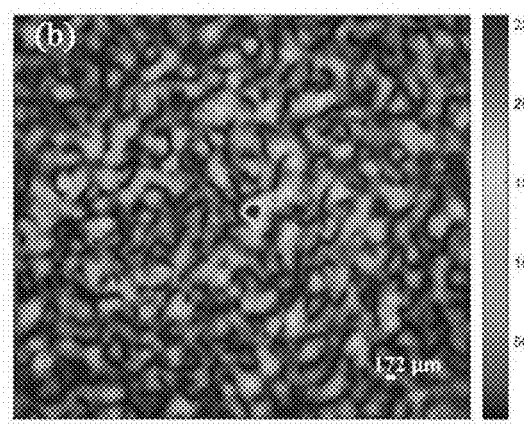
Figure 11C:
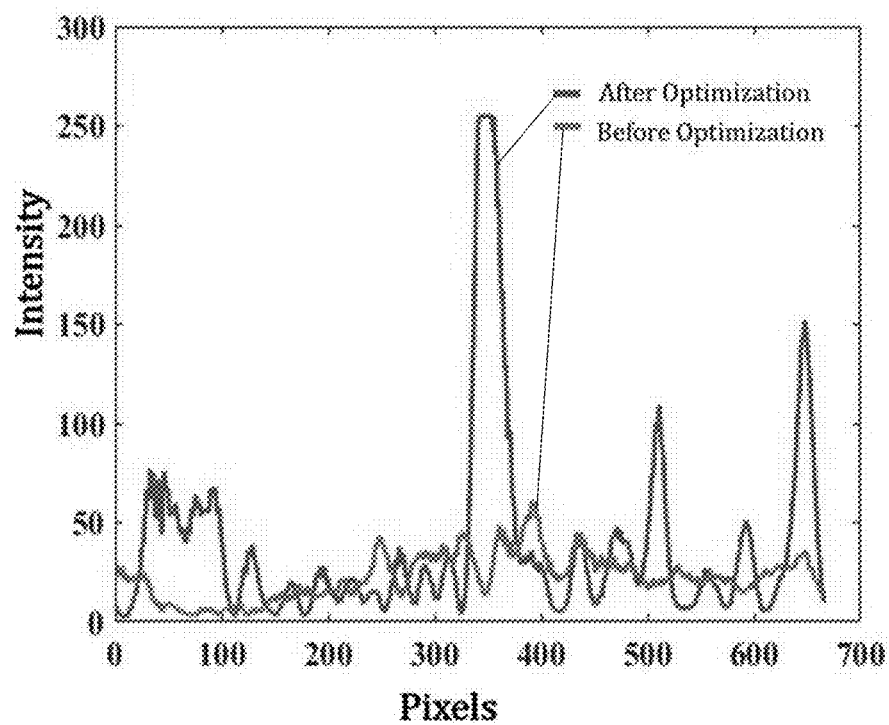

FIGS. 11A to 11E show the results for this set of experiments. The speckle intensity captured on the CAM2 before the optimization is shown in FIG. 11A. FIG. 11D is the image captured using a smartphone by placing a screen on the same plane as of CAM2. This shows that indeed, before optimization, the distribution of the speckle field is over a larger area and CAM2 captures only a portion of this field. After optimization, the inventors achieve a strong focus with a spot size of 172 μm (FWHM) as shown in FIG. 11B. The intensity profile along an axis for both FIGS. 11A and 11B is plotted in FIG. 11C. The pbr has increased 6 times compared to the unfocused condition. FIG. 11E shows the photo captured using a smartphone by placing a screen on the same plane after optimization. Comparing FIGS. 11D and 11E it can be seen that the entire speckle energy is concentrated in the center after the optimization and there is a focal spot (FIG. 11B) within the same.

Figure 12C:
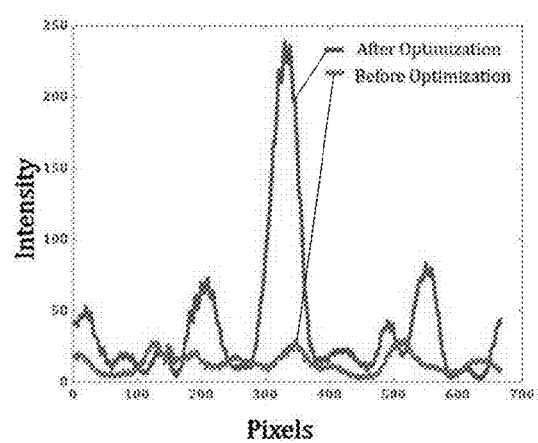
Figure 12D:
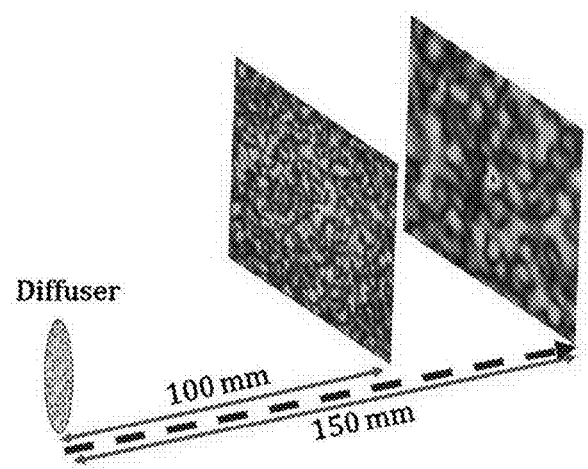

A second set of experiments were performed to axially scan the focal spot and the results are shown in FIGS. 12A to 12D. Again, using Eq. (27), changing the value of z to 150 mm, and performing an optimization based on the new condition, the inventors were able to shift the focus to a plane at a distance of 150 mm (z=150 mm) from the diffuser. As can be seen in FIG. 12A, the non-optimized case has scattered speckles, however, after optimization in FIG. 12B, the inventors obtain a strong focus with a spot size of 286 μm (FWHM). FIG. 12C shows the intensity profiles for FIGS. 12A and 12B. The pbr has improved almost 5 times the unfocused case. Here also the inventors have effectively used 40×40 pixels on the SLM by binning 27×27 as one pixel. FIG. 12D depicts on the same figure t the results of both experiments demonstrating the successful scanning of the spot in z at different distances from the diffuser.

For most biological applications like imaging a specimen through a scattering tissue, it is important that the produced focal spot can shift within a desired field of view. Hence, in the next set of experiments, the inventors show that it is possible to shift the obtained focal spots laterally as well. This can be done either by multiplying the optimized phase mask obtained with a linear grating or by shifting the pattern on the SLM which in turn will shift the focal spot due to the memory effect of speckles. The inventors use the results from the first set of experiments performed, i.e., by shifting the optimized phase mask used to produce the focal spot in FIG. 11B, it is possible to shift the focal spot. The maximum possible shift is 348 μm from the initial focus spot on both sides along the x direction. In the y axis, one can shift to a maximum of 667 μm in both directions from the initial focal spot.

Figure 13A:
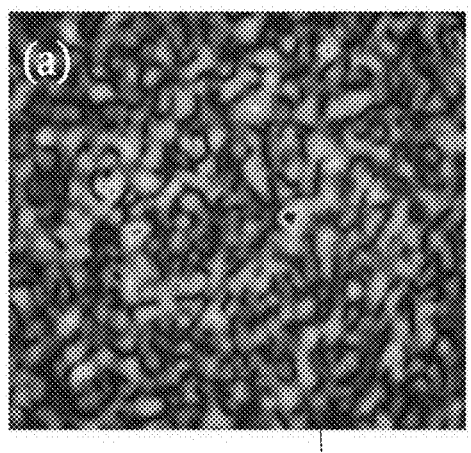
Figure 13B:
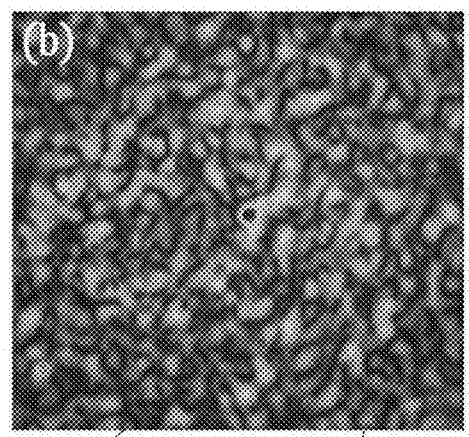
Figure 13D:
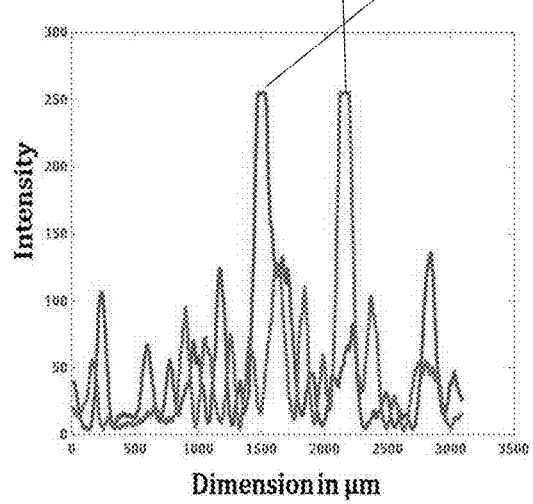
Figure 13E:
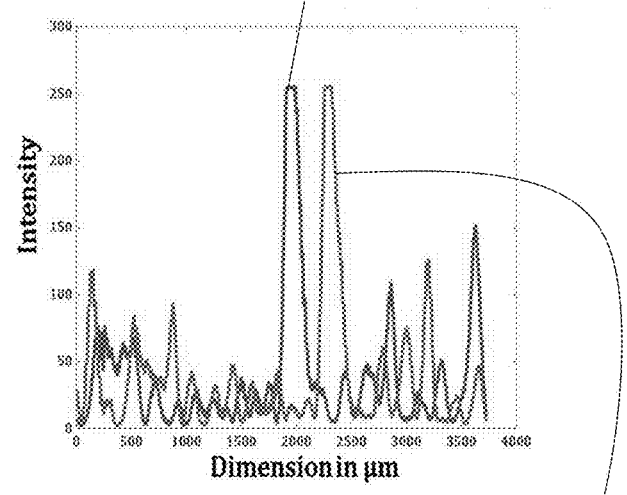
Figure 13C:
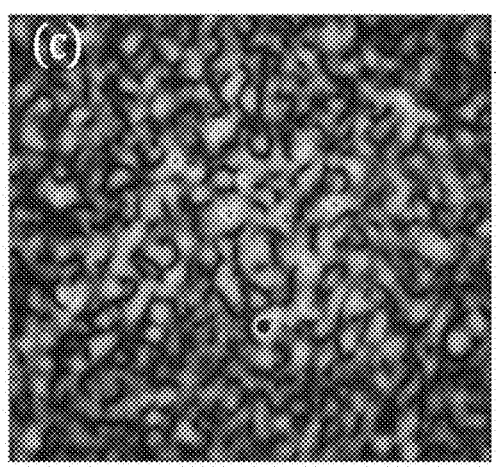

FIGS. 13A and 13C show the shift both in x and y, respectively, compared to the unshifted case shown in FIG. 13B. The profile plots in FIGS. 13D and 13E show the shifts in microns with respect to the original spot in FIG. 13B, wherein FIG. 13D shows the profile view of FIGS. 13B and 13A (shift of 348 μm from the initial focus spot along the x direction), and FIG. 13E shows the profile view of FIGS. 13B and 13C (shift of 667 μm from the initial focus spot along the y direction).

Thus, the inventors have presented a novel technique for imaging an object hidden by a scattering medium utilizing the novel approach to focus light through the scattering medium non-invasively while eliminating a need for any knowledge about the scattering properties of the medium as well as use of any feedback mechanism from behind the medium.

The invention claimed is:

1. A system for use in imaging an object through a scattering medium, the system comprising:
    an imaging system comprising: a light source unit generating input light forming coherent illumination of at least one selected wavelength range; a beam shaping unit controllably operable to generate selectively varying wavefront patterns of said input light to thereby form wavefront shaped coherent illumination propagating through the scattering medium towards an object region; and a detection unit comprising at least one pixelated detector configured and operable to detect light including output light originated at said object in response to said wavefront shaped coherent illumination and passed through said scattering medium, and generate image data about the object; and
    a control system in data communication with the beam shaping unit and with said detection unit and comprising an image processor configured and operable to process the image data and generate structured data indicative of a structure of the object;
    wherein said imaging system comprises an interferometric unit, said detection unit further generating measured data comprising amplitude and phase of the output light; and
    wherein the control system further comprises a data processor comprising a beam shaping controller configured and operable to analyze the measured data and produce operational data to said beam shaping unit indicative of optimized selectively varying wavefront patterns to produce optimized wavefront shaped coherent illumination comprising multiple illumination spots focused on a first array of focal planes at the object region and a second array of lateral locations in each focal plane, said image processor utilizing the image data and data indicative of said operational data to interpret the image data and extract therefrom the structured data indicative of a 3D structure of the object.

2. The system according to claim 1, wherein said interferometric unit is configured and operable to split coherent light emitted by the light source into an off-axis reference beam propagating towards the detection unit and an on-axis object beam forming said input light propagating towards said beam shaping unit, and combine the output light and the reference beam into the light being detected and being indicative of an interference pattern between said reference beam and said output light that passed twice through said scattering medium.

3. The system according to claim 1, wherein the beam shaping unit comprises a spatial light modulator (SLM).

4. The system according to claim 3, wherein said SLM is configured to define a matrix of phase affecting elements.

5. The system according to claim 4, wherein said matrix of the phase affecting elements comprises of an array of separately operable sub-arrays of said phase affecting elements.

6. The system according to claim 4, wherein said beam shaping unit is configured and operable to generate said selectively varying wavefront patterns comprising consecutively generated varying wavefront patterns, said imaging system thereby performing time scanning of the object region with said multiple illumination spots, such that said illumination spots of the first array being consecutively projected on a corresponding array of the focal planes at the object region.

7. The system according to claim 6, wherein said consecutively generated varying wavefront patterns are such that said illumination spots of the second array of the lateral locations are consecutively projected on a corresponding array of the lateral locations in said corresponding array of the focal planes, respectively.

8. The system according to claim 4, wherein said selectively varying wavefront patterns correspond to simultaneous generation of the multiple illumination spots including a plurality of the illumination spots on the first array of different focal planes.

9. The system according to claim 8, wherein said selectively varying wavefront patterns correspond to simultaneous generation of the multiple illumination spots including a plurality of the illumination spots on the second array of the lateral locations in at least one focal plane.

10. The system according to claim 9, wherein said selectively varying wavefront patterns correspond to simultaneous generation of the multiple illumination spots including a plurality of the illumination spots of the second array of the lateral locations in the different focal planes.

11. The system according to claim 1, wherein said imaging system is configured and operable to generate said illumination spots of different wavelength ranges.

12. The system according to claim 1, wherein said operational data is indicative of axial shifts of focus of the imaging system thereby forming said first array of the focal planes downstream of the scattering medium with respect to a general propagation path of the coherent illumination.

13. The system according to claim 12, wherein the beam shaping controller is configured and operable to analyze the measured data and determine an optimized wavefront shaping function to be applied to the input light to satisfy a predetermined condition of a relation between optical fields of the input light and the output light, $E_{in}$ and $E_{out}$, with respect to each desired focal plane downstream of the scattering medium.

14. The system according to claim 13, wherein said beam shaping controller comprises an axial-shift optimizer utility configured and operable to utilize representation of the output light field $E_{out}$ originated at the desired focal plane at a z-distance from a plane of the scattering medium as $g(z) \cdot E^{\oplus}_{out}$, wherein $E^{\oplus}_{out}$ is a conjugate of $E_{out}$, and $g(z)$ is a predetermined function describing light propagation through a given space, and determine an optimization function to be applied to the input light to satisfy said predetermined condition of the relation between an optimized input light field, $(E_{in})_{opt}$, and said representation of the output light field $g(z) \cdot E^{\oplus}_{out}$.

15. The system according to claim 14, wherein said predetermined condition of the relation between the optimized input light field, $(E_{in})_{opt}$, and said representation of the output light field $g(z) \cdot E^{\oplus}_{out}$ for the desired focal plane is: $(E_{in})_{opt} = g(z) \cdot E^{\oplus}_{out}$.

16. The system according to claim 12, wherein said operational data is further indicative of lateral shifts of focus of the imaging system, thereby forming said second array of the lateral locations of the illumination spot in the focal plane.

17. The system according to claim 16, wherein said the beam shaping controller comprises a lateral-shift optimizer utility configured and operable to analyze the measured data and determine an optimization factor to be applied to the input light $E_{in}$ to project the illumination spot on a laterally shifted location, said optimization factor being a linear phase gradient.

18. The system according to claim 1, wherein said operational data is indicative of lateral shifts of focus of the imaging system, thereby forming said second array of the lateral locations of the illumination spot in the focal plane.

19. The system according to claim 18, wherein the beam shaping controller comprises a lateral-shift optimizer utility configured and operable to analyze the measured data and determine an optimization factor to be applied to the input light $E_{in}$ to project the illumination spot on a laterally shifted location, said optimization factor being a linear phase gradient.

20. A control system for use in imaging of an object through a scattering medium, the control system being configured as a computer system comprising data input and output utilities, a memory utility and a data processor, the data processor comprising:

a beam shaping controller configured and operable to operate a beam shaping unit affecting a wavefront pattern of coherent illumination of input light, said beam shaping controller being configured and operable to process measured data generated by a pixelated detector and being indicative of at least a phase of output light which is originated at the object in response to said wavefront pattern of the input light incident on the object via the scattering medium and which passed through said scattering medium to the pixelated detector, processing of the measured data comprising generation of operational data to the beam shaping unit comprising data indicative of selectively varying optimized wavefront patterns of the input light to be used in imaging sessions, said optimized wavefront patterns of the input light convergence conditions with respect to the output light for multiple illumination spots to be focused on a first array of focal planes at the object and a second array of lateral locations in each focal plane, an image processor configured and operable to receive image data generated by the pixelated detector and data indicative of said operational data to interpret the image data and extract therefrom structured data indicative of a 3D structure of the object.

\* \* \* \* \*